United States Patent

Nagano

[11] Patent Number: 5,582,719
[45] Date of Patent: Dec. 10, 1996

[54] FILTRATION SYSTEM

[76] Inventor: Yohoji Nagano, 6-19-8 Sikahama, Adachi-ku, Tokyo, Japan

[21] Appl. No.: 390,384

[22] Filed: Feb. 17, 1995

[30] Foreign Application Priority Data

Feb. 22, 1994 [JP] Japan .................. 6-002329 U

[51] Int. Cl.[6] .................. A01K 63/04; C02F 3/06; B01D 27/08
[52] U.S. Cl. .................. 210/139; 210/143; 210/151; 210/169; 210/232; 210/416.2; 210/419; 210/420; 210/460; 210/484
[58] Field of Search .................. 210/139, 140, 210/143, 150, 151, 169, 232, 247, 258, 266, 416.2, 419, 420, 455, 456, 484

[56] References Cited

U.S. PATENT DOCUMENTS

| | | | |
|---|---|---|---|
| 3,720,317 | 3/1973 | Willinger | 210/169 |
| 3,746,168 | 7/1973 | Willinger et al. | 210/169 |
| 4,033,719 | 7/1977 | Conn et al. | 210/169 |
| 4,043,914 | 8/1977 | Horvath | 210/169 |
| 4,145,289 | 3/1979 | Seroussi | 210/169 |
| 4,151,810 | 5/1979 | Wiggins | 210/169 |
| 4,206,054 | 6/1980 | Moore et al. | 210/169 |
| 4,597,871 | 7/1986 | Okouchi et al. | 210/456 |
| 4,622,134 | 11/1986 | Kobayashi | 210/139 |
| 4,634,523 | 1/1987 | Lin | 210/140 |
| 5,011,600 | 4/1991 | Mowka, Jr. et al. | 210/169 |
| 5,433,843 | 7/1995 | Calabrese | 210/169 |

*Primary Examiner*—Peter A. Hruskoci
*Assistant Examiner*—Theodore M. Green
*Attorney, Agent, or Firm*—Frishauf, Holtz, Goodman, Langer & Chick

[57] ABSTRACT

A filtration system comprising a housing whose overall surface, excepting a bottom surface and an upper surface, is tightly closed, a filter medium disposed within the housing, an air jetting portion disposed within the housing at a higher location than the filter medium, and a propeller fan disposed at an upper portion of the housing and rotated by air which is jetted from the air jetting portion.

17 Claims, 13 Drawing Sheets

FILTRATION SYSTEM

BACKGROUND OF THE INVENTION

1. Field of the Invention

This invention relates generally to a filtration system.

2. Brief Description of the Related Art

In general, various kinds of corruption factors are usually produced in a water tank for keeping aquatic animals and plants for hobby or ornamental purposes. For example, in a water tank for aquatic animals, water in the tank is often corrupted by discharged materials, bait or feeds, algae, seaweed, etc. If this condition is left as it is, the degree of clearness and transparency of the water and water tank are lowered. As a result, it becomes difficult for those who keep such aquatic animals to fully enjoy watching the aquatic animals. In addition, hazardous components such as ammonia, nitrogen and the like are increasingly produced to the extent that the aquatic animals are killed and plants are abnormally grown. In order to prevent such an unfavorable occurrence, various types of filtration systems are conventionally used for removing such corruption factors in the water.

Several types of filtration systems for a water tank for keeping aquatic animals and plants are known. One example is shown in FIG. 6, in which a filter medium 103 composed of only a single or several kinds of chemical fiber materials or a combination of sand-layers and filter, is received in a container 102 which is separately situated from a water tank 101, and the water in the tank 101 is drawn up by a motor pump 106 through an intake tube 105 having a meshed basket 104 at a lower portion of the tube 105 and discharged to the upper surface of the filter medium 103 in the container 102 via a discharge tube 107, and then allowed to flow back to the water tank 101 through a return tube 108. Another example is shown in FIG. 7, in which a filter medium is received in a container 109 having a plurality of inlet ports formed in a bottom surface or a side surface thereof, the container 109 is then placed on a bottom portion of a water tank 101, and an upper end portion of the container 109 is connected to a motor pump 111 through an intake tube 110, so that the water in the water tank 101 flows to and passes through the filter medium and then drawn by the motor pump 111 so as to be returned to the water tank 101 through a return tube 112. An additional example is shown in FIG. 8, in which the water in a water tank is drawn into a container 115 located outside the water tank by a motor pump 116 located in the top of the container 115 through an intake tube 114 having a meshed basket 114 on a bottom portion of the water tank, so that the water passes through a filter medium received in the container 115, and then flows back into the water tank through a return tube 117.

Incidentally, it is a general practice to deliver air into a water tank from an air pump located outside the water tank through a tube, in order to supply oxygen into the water.

However, any one of the above-mentioned conventional filtration systems employs as a solid-liquid separator only one clean filtration means or system, such as a filter (chemical fiber material, filter paper, etc.) and/or a particulated filter medium layer (sand layer). Since it is designed such that the water in the water tank flows directly to the filter medium to capture the corruption factors contained in the water by the filter medium, filtration efficiency is comparatively low.

That is to say, in any one of the above-mentioned conventional filtration systems, particulates as corruption factors are captured directly by the filter medium during the process of filtration. Therefore, as the amount of particulates captured by the filter medium is increased, the filter liquid flow path formed in the filter material is narrowed in a comparatively short time and finally completely choked whereby clogging is produced. Accordingly, in the example shown in FIG. 6, the non-filtered water drawn up by the pump merely passes across the surface of the filter medium and directly flows back to the water tank. Also, in the examples shown in FIGS. 7 and 8, since the speed of water passing within the filtration system is lowered due to clogging, there is produced a region where the water flow is weak or none, within the water tank. As a result, the corruption factors are precipitated on the bottom portion of the water tank and condensed into sludge which produces hazardous components. Then, the corruption factors in the form of sludge are caused to suspend or float within the water tank in accordance with the water flow produced by the aquatic animals swimming in the water of the water tank or air supplied to the water tank.

In order to prevent an early and complete choking or blocking of the filter surface caused by such corruption matters, it is necessary to have a large filtration area dimension. However, if the filtration area dimension is increased, a filtration system as a final product becomes large in size. Recently, there is a tendency that very tiny aquatic animals or plants are kept in a small-sized water tank. Therefore, there is demanded a small-sized filtration system having an excellent filtration efficiency, so as to match with such a small-sized water tank.

Further, since any one of the above-mentioned conventional filtration systems employs a motor pump in order to forcibly circulate water, costs of electric power are increased and noises are produced.

Furthermore, in the conventional filtration systems mentioned above, various attachments such as intake tube (104, 105; 113, 114) attached with a meshed basket, discharge tube (107), motor pump (106, 111, 116) and return tube (108, 112, 117) are essentially employed, in addition to the filter medium receiving portion (103, 109, 115) acting as a main body for exhibiting the filtration function. Accordingly, the appearance of the system is unsightly, and handling is not easy when cleaning.

The present invention has been accomplished in order to obviate the above problems inherent in the conventional systems.

SUMMARY OF THE INVENTION

It is, therefore, an object of the present invention to provide a filtration system which is small in size and yet improved significantly in filtration efficiency, and in which no noises are produced and the number of attachments is minimized as much as possible.

Another object of the invention is to provide a filtration system, in which the speed of fluid passing through a filter medium is efficiently increased by using other means than a motor pump, so that filtration efficiency is significantly improved and no noises are produced.

A further object of the invention is to provide a filtration system which can be made compact in size and high in filtration efficiency through a unique combination of several different types of filtration means or systems.

A still further object of the invention is to provide constructions of a filter medium receiving portion and a fluid accelerator portion, in order to facilitate an easy assembling of the filtration system.

In order to achieve the above objects, according to a first invention, there is provided a filtration system comprising a housing whose overall surface, excepting a bottom surface and an upper surface, is tightly closed, a filter medium disposed within the housing, an air Jetting portion disposed within the housing at a higher location than the filter medium, and a propeller fan disposed at an upper portion of the housing and rotated by air which is jetted from the air jetting portion.

According to a second embodiment of the invention, there is also provided a filtration system comprising a housing, an introduction sleeve for introducing an original fluid upwardly within the housing from a bottom portion of the housing, a precipitation portion formed between a bottom wall and a peripheral wall of the housing and the introduction sleeve, a filter medium receiving portion disposed at a higher location than the introduction sleeve within the housing, an air jetting portion disposed at a higher location than the filter medium receiving portion within the housing, and a propeller fan disposed at an outlet port formed at an upper portion of the housing and rotated by air jetted from the air jetting portion, the filter medium receiving portion including an inverted cone-like separation surface having an apex generally on the center of the introduction sleeve, the separation surface including a collision surface to be hit by corruption factors contained in the original fluid so that the corruption factors fall back toward the precipitation portion and a plurality of through-holes for passing the fluid therethrough.

The second embodiment is characterized in that the introduction sleeve is provided at an upper end portion thereof with a partition member having an ascent funnel-like guide portion extending generally in parallel with the separation surface of the filter medium receiving portion up to an intermediate position of the separation surface, and a descent funnel-like guide portion inclining toward the precipitation portion from an upper end portion of the guide portion.

Also, the second embodiment is characterized in that a weight-functioning filter medium receiving portion for receiving therein a weight-functioning filter medium is formed on a lower side of the housing, a through-hole for passing therethrough the original fluid to the weight-functioning filter medium receiving portion is formed in a bottom portion of the weight-functioning filter medium receiving portion, and a through-hole for passing therethrough a fluid from the weight-functioning filter medium receiving portion to the introduction sleeve is formed in the introduction sleeve.

Further, the second embodiment is characterized in that the through-holes formed in the separation surface are vertical slits continuous from a lower end portion of the separation surface to an upper end portion thereof, and arranged in a circumferential direction.

Furthermore, the second invention is characterized in that the housing has a locking portion for locking a filter medium receiving cartridge engaged with an inner side of an upper portion of a peripheral wall of the housing, the filter medium receiving portion is of a cartridge type construction comprising a container body provided on a lower surface thereof with a separation surface of an inverted cone-like configuration and containing therein a filter medium, the separation surface having a collision surface and a plurality of through-holes for passing fluid therethrough, and a closure for closing an upper opening of the container body, the filter medium receiving portion having a portion to be locked when fitted to an inner side of an upper portion of the peripheral wall of the housing, and the air jetting portion and the propeller fan are of a cartridge type construction, in which the air jetting portion is mounted on an inner side of a lower portion of a tubular cap of different diameters, opening upwardly and downwardly, one end of a connection tube is connected to the air jetting portion and the other end is allowed to project outwardly of the cap, the propeller fan is built in an inner side of an upper portion of the cap above the air injecting portion, and a lower end portion of the cap is removably connected to an upper end portion of the housing.

A filter medium receiving portion according to a third embodiment of the invention, is characterized in that it includes a container body provided on a lower surface thereof with a collision surface and a cone-like separation surface having a plurality of through-holes for passing fluid therethrough and containing therein a filter medium, and a mesh-like closure for closing an upper surface of the container body, the filter medium receiving portion being removably secured to an inner side of an upper portion of a housing of a filtration system.

A fluid accelerator portion according to a fourth embodiment of the invention is characterized in that it comprises an air jetting portion mounted on an inner side of an upper portion of a tubular cap of different diameters opening upwardly and downwardly, a connection tube one end of which is connected to the air jetting portion and the other end of which is allowed to project outwardly of the cap, and a propeller fan built in the cap above the air jetting portion, a lower end portion of the cap being removably attached to an upper portion of a housing of a filtration system.

With the first embodiment of the invention having the above-mentioned construction, since the fluid within the housing is lifted upwardly under the effect of the lifting power of air bubbles jetted out of the air jetting portion and the propeller fan is rotated by the continuously lifting air bubbles, the filtrated fluid within the housing is forcibly discharged and the speed of passage is increased. Accordingly, filtration efficiency is remarkably improved by the filter medium in the housing. Further, the corruption factors on the outside of the bottom portion of the housing are forcibly taken into the system by the strong flow of the fluid.

In the second embodiment of the invention, the original fluid introduced upwardly within the housing from the bottom portion of the housing is increased in its ascending speed by the air bubbles continuously jetted out or the air jetting portion and ascending, and the propeller fan rotated by the air bubbles, guided toward the inverted cone-like separation surface of the filter medium receiving portion. The particulates having a comparatively large diameter, contained in the original fluid, are hit against the collision surface of the separation surface and fall back toward the precipitation portion where the particulates are precipitated and condensed. The particulates contained in the fluid which has passed the large number of through-holes formed in the separation surface of the filter medium receiving portion, are captured by the filter medium received in the filter medium receiving portion, and the fluid, which has passed through the filter medium, is forcibly lifted upwardly by the ascending air bubbles and the rotating propeller fan and discharged through the outlet port of the housing.

In the case where the introduction sleeve is provided at an upper end portion thereof with a partition member having an ascent funnel-like guide portion extending generally in parallel with the separation surface of the filter medium receiving portion up to an intermediate position of the separation surface, and a descent funnel-like guide portion inclining toward the precipitation portion from an upper end portion of the guide portion, hitting of the particulates against the separation surface is enhanced, and the separation effect is improved. Moreover, the corruption matters precipitated in the precipitation portion are prevented from lifting or floating upwardly.

In the case where the weight-functioning filter medium receiving portion for receiving therein a weight-functioning filter medium is formed on a lower side of the housing, a through-hole for passing therethrough the original fluid to the weight-functioning filter medium receiving portion is formed in a bottom portion of the weight-functioning filter medium receiving portion, and a through-hole for passing therethrough a fluid from the weight-functioning filter medium receiving portion to the introduction sleeve is formed in the introduction sleeve, such quadruplicate filtration operations are performed as primary filtration by the weight-functioning filter medium receiving portion, hit and fall-back separation by the separation surface, filtration by the precipitation portion and filtration by the filter medium or filtration by the filter medium receiving portion. Therefore, remarkably reliable filtration effects can be obtained.

In the case where the vertical slits continuous from a lower end portion of the separation surface to an upper end portion thereof are arranged in a circumferential direction, an increase in resistance of passage by the corruption factors retained on the separation surface can be diminished.

In the case where the housing has a locking portion for locking a filter medium receiving cartridge, the filter medium receiving portion is of a cartridge type construction having a portion to be locked which is locked to the locking portion of the housing, the air jetting portion and the propeller fan are of a cartridge type construction, in which the air jetting portion and the propeller fan are mounted on the upper and lower sides of the tubular cap of different diameters, and a lower end portion of the cap is removably connected to an upper end portion of the housing, the filtration system can be easily assembled by fitting the filter medium receiving cartridge to the housing and connecting the cartridge of the air jetting portion and the propeller fan to an upper end portion of the housing. Also, the filtration system can be easily disassembled for cleaning.

Since the filter medium receiving portion according to the third embodiment is of a cartridge type construction and has a portion to be locked to the upper portion of the housing, it can be easily attached to and removed from the housing of the filtration system and therefore, adhered matters to the separation surface can be easily removed and cleaned. The filter medium receiving portion can also be replaced independently.

Since the fluid accelerator portion according to the fourth embodiment is of a cartridge type construction and removably attached to an upper portion of the housing of the filtration system, it can easily be removed whenever necessary and cleaned. It is also possible to replace the fluid accelerator portion independently.

The foregoing has outlined some of the more pertinent objects of the present invention. These objects should be construed as being merely illustrative of some of the more prominent features and applications of the invention. Many other beneficial results can be obtained by applying the disclosed invention in a different manner or modifying the invention within the scope of the invention. Accordingly, other objects in a full understanding of the invention may be had by referring to the summary of the invention, the detailed description describing the preferred embodiments in addition to the scope of the invention defined by the claims taken in conjunction with the accompanying drawings.

DETAILED DESCRIPTION OF THE EMBODIMENTS

Figure 1:
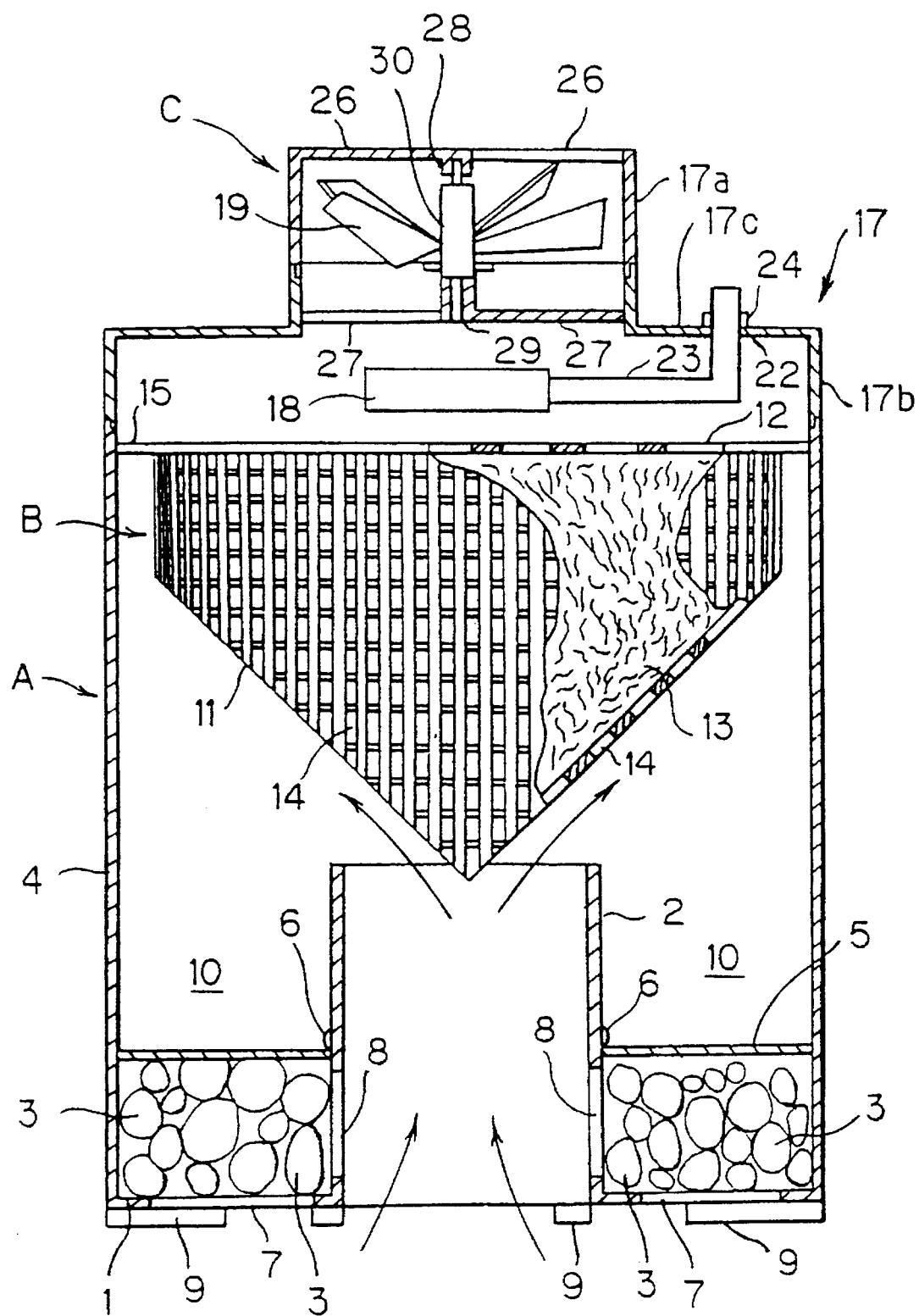
FIG. 1 is a vertical sectional view of a filtration system according to a first embodiment of the present invention.
Figure 2:
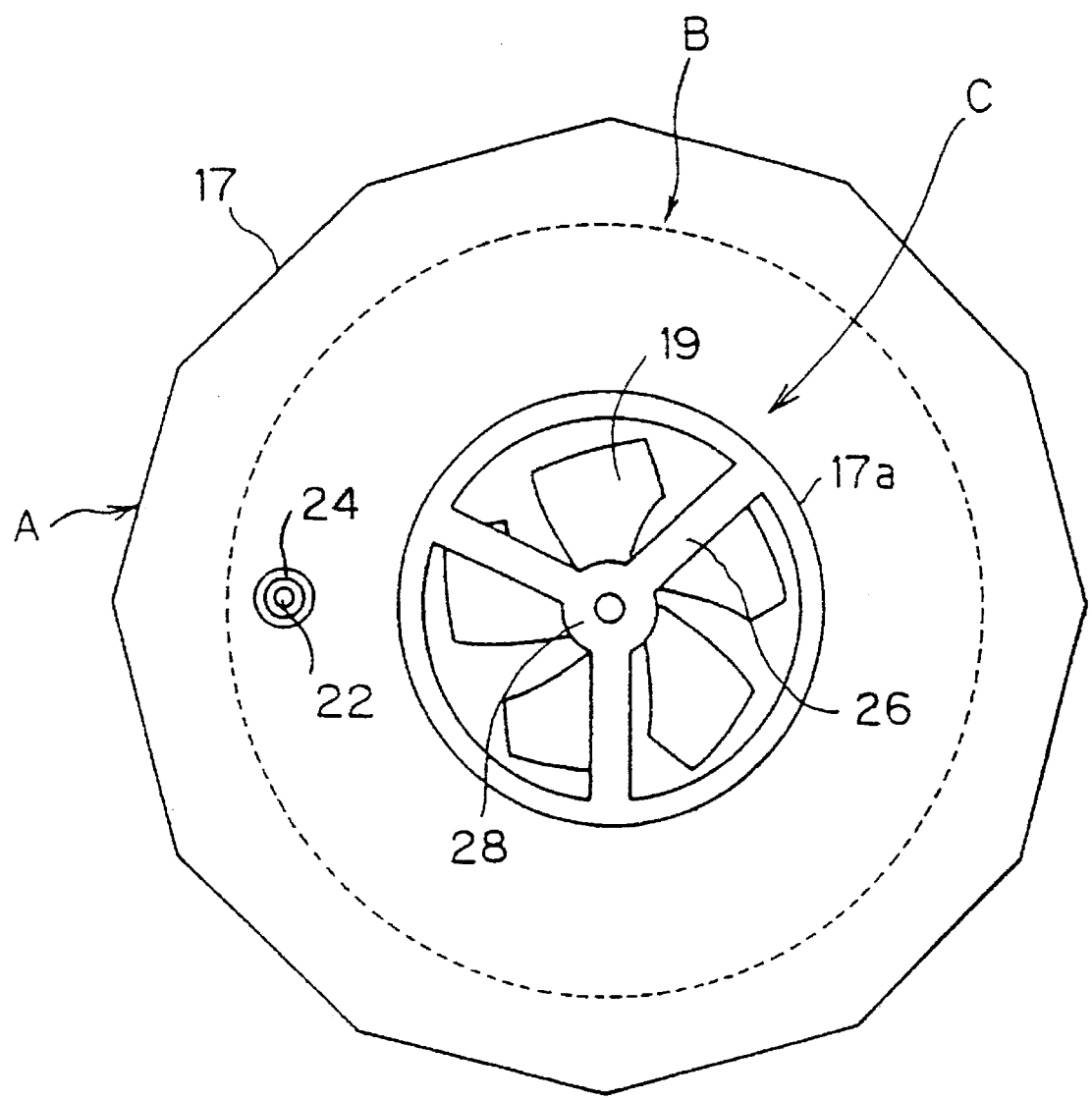
FIG. 2 is a plan view of the filtration system of FIG. 1.
Figure 3:
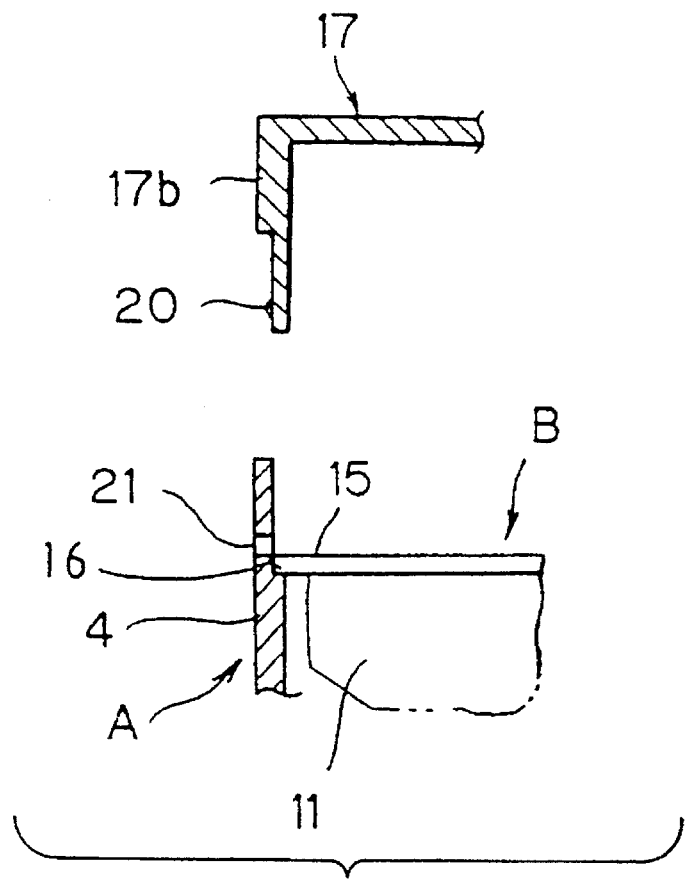
FIG. 3 is a sectional view of an important portion showing a holding (or retaining) state of a filter medium receiving portion and a fluid accelerator portion with respect to a housing.
Figure 4:
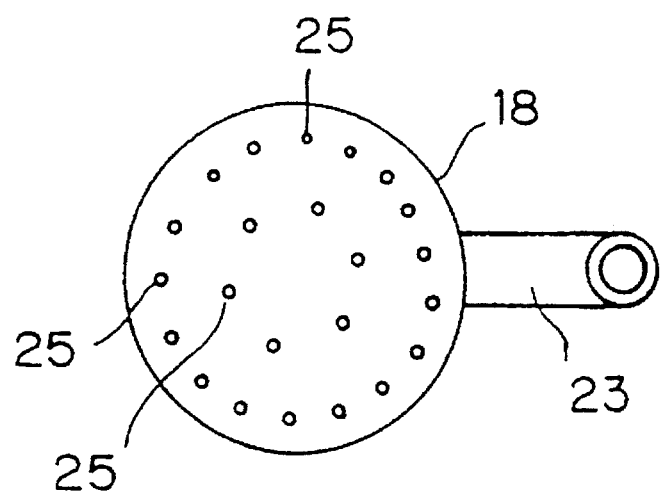
FIG. 4 is a plan view of an air jetting portion.
Figure 9:
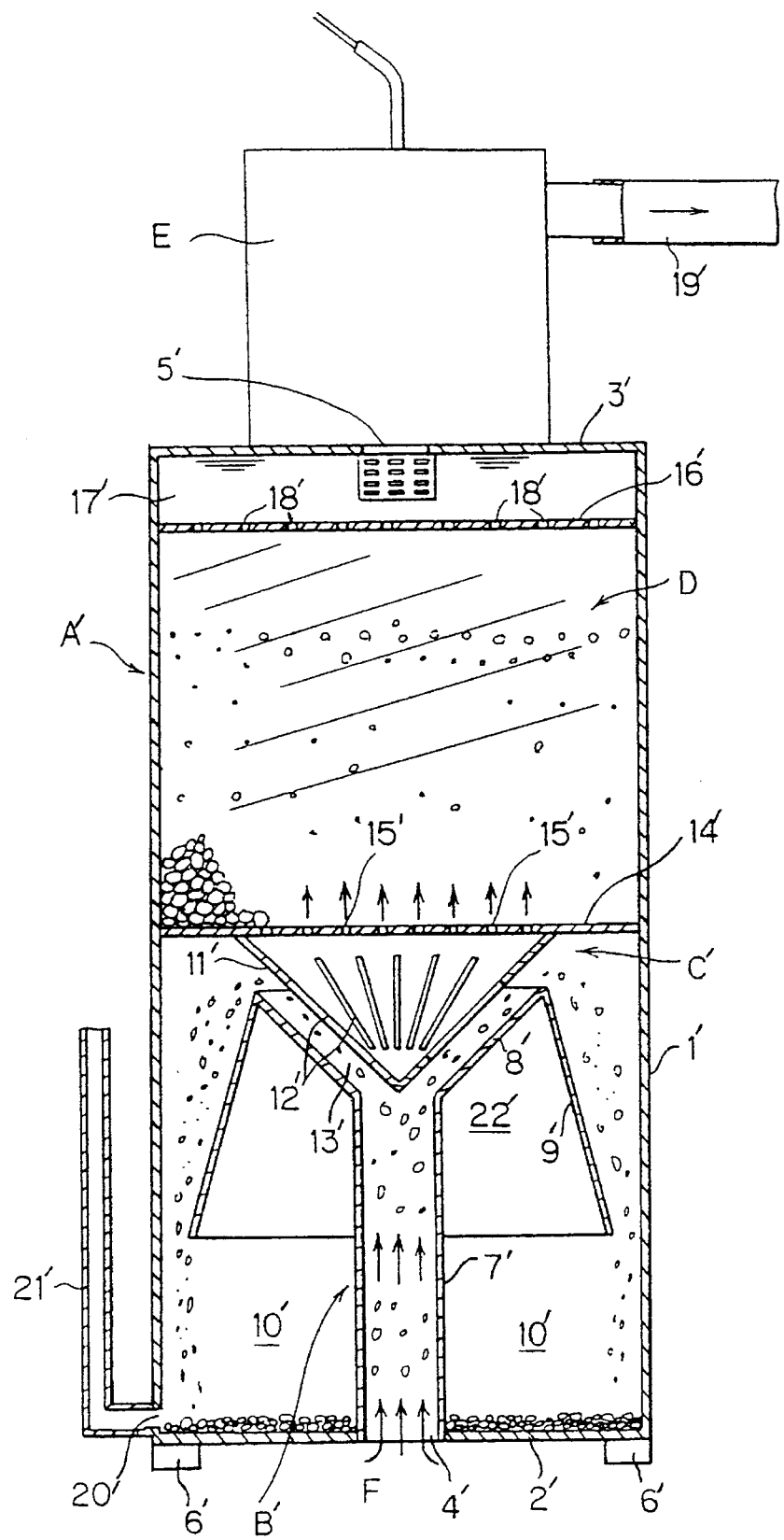
FIG. 9 is a vertical sectional view of a filtration system according to another embodiment of the invention.
Figure 10:
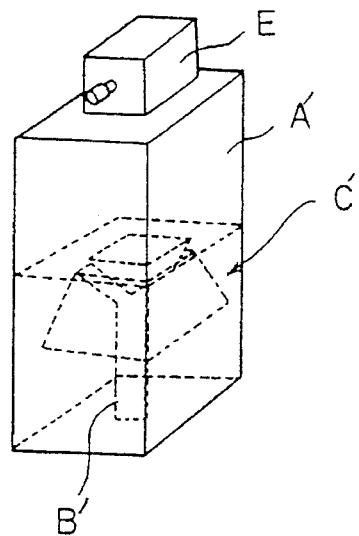
FIG. 10 is a perspective view of the filtration system of FIG. 9.
Figure 11:
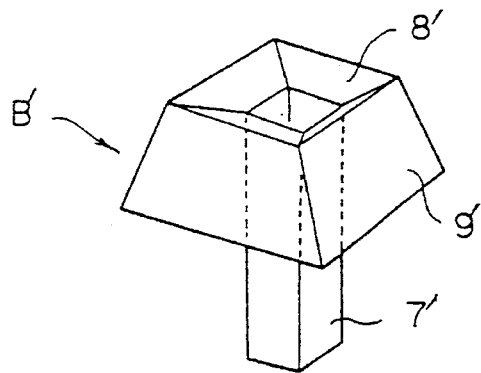
FIG. 11 is a perspective view of an introduction sleeve.
Figure 12:
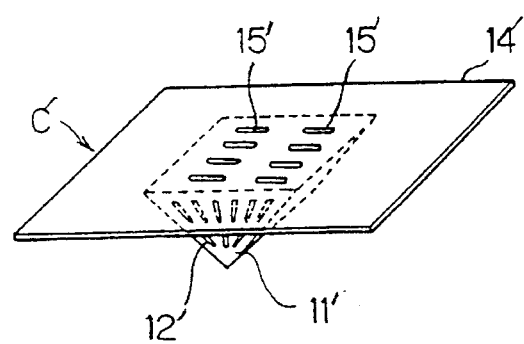
FIG. 12 is a perspective view of a diffusion separation member.
Figure 13:
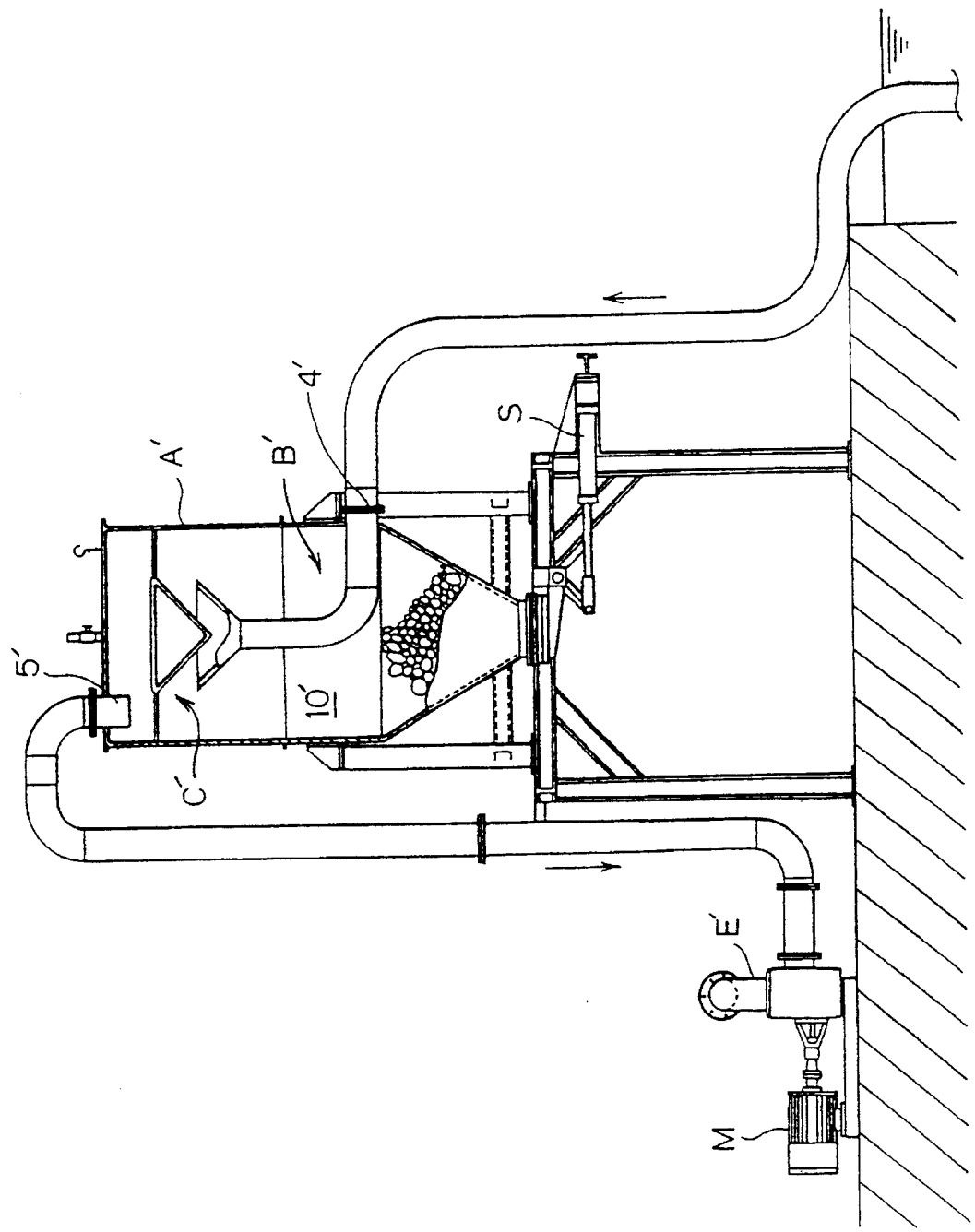
FIG. 13 is a side view showing a using example of the filtration system of FIG. 9.
Figure 14:
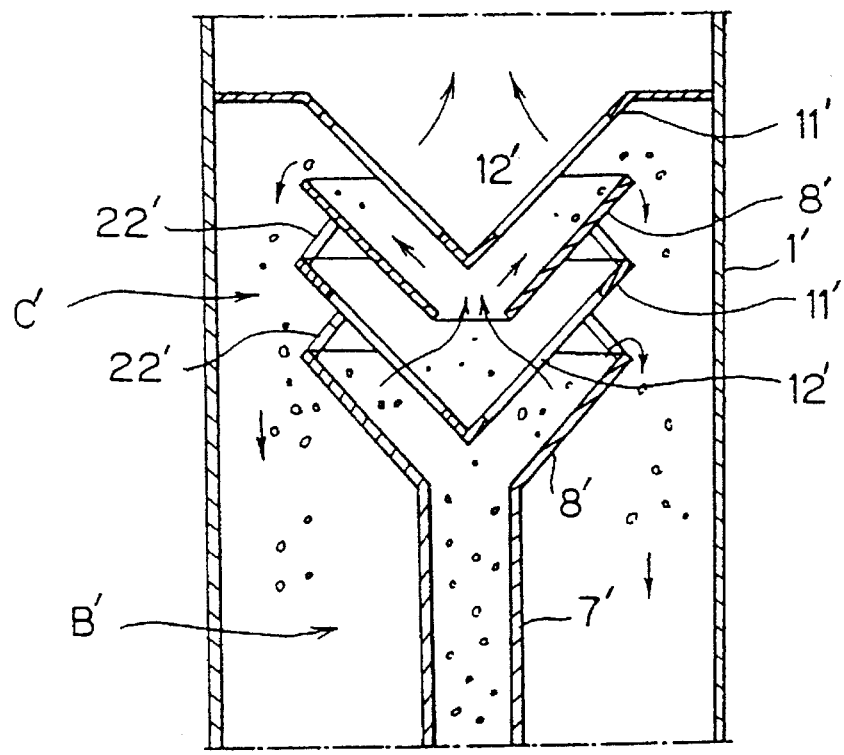
FIG. 14 is a sectional view of another example of an important portion.
Figure 15:
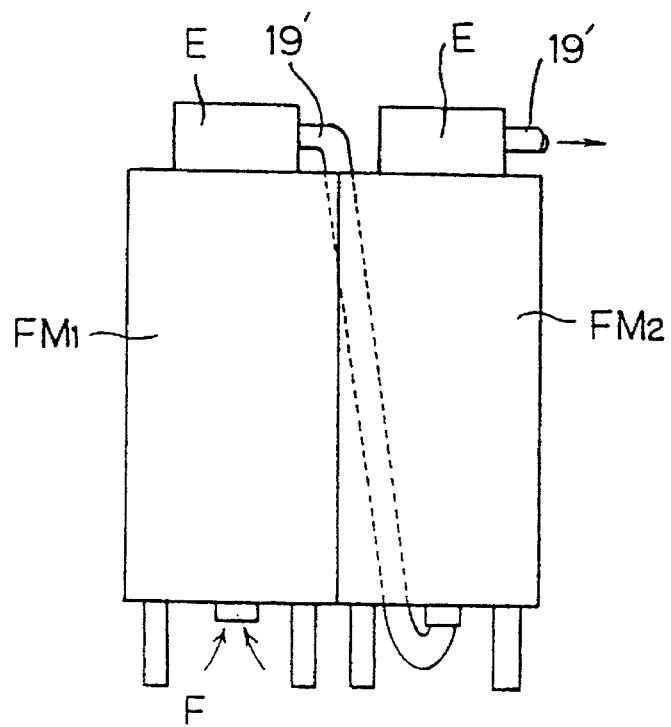
FIG. 15 is a side view showing one example of a using mode.
Figure 16:
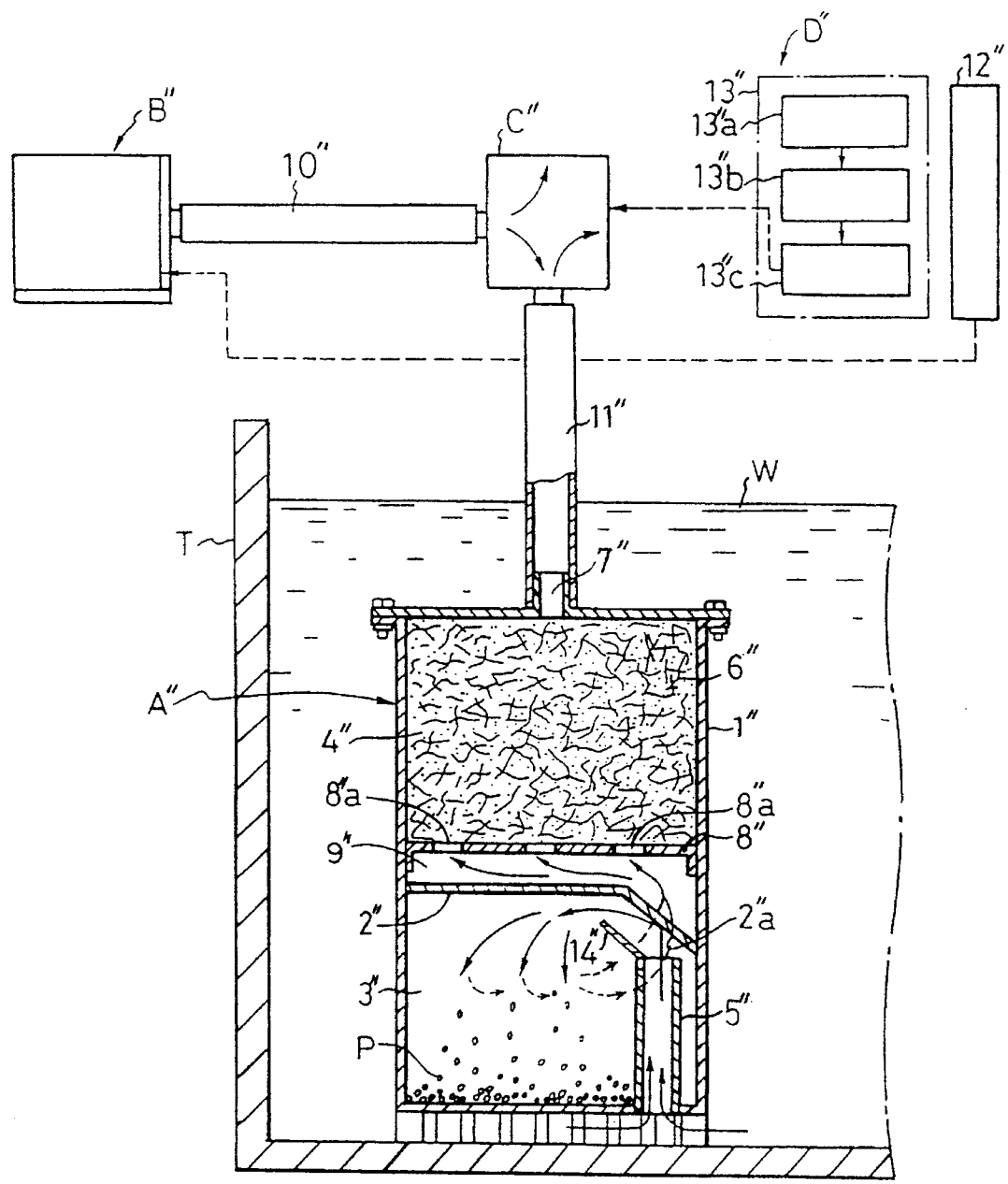
FIG. 16 is a vertical sectional view of a filtration system according to another embodiment of the invention.
Figure 17:
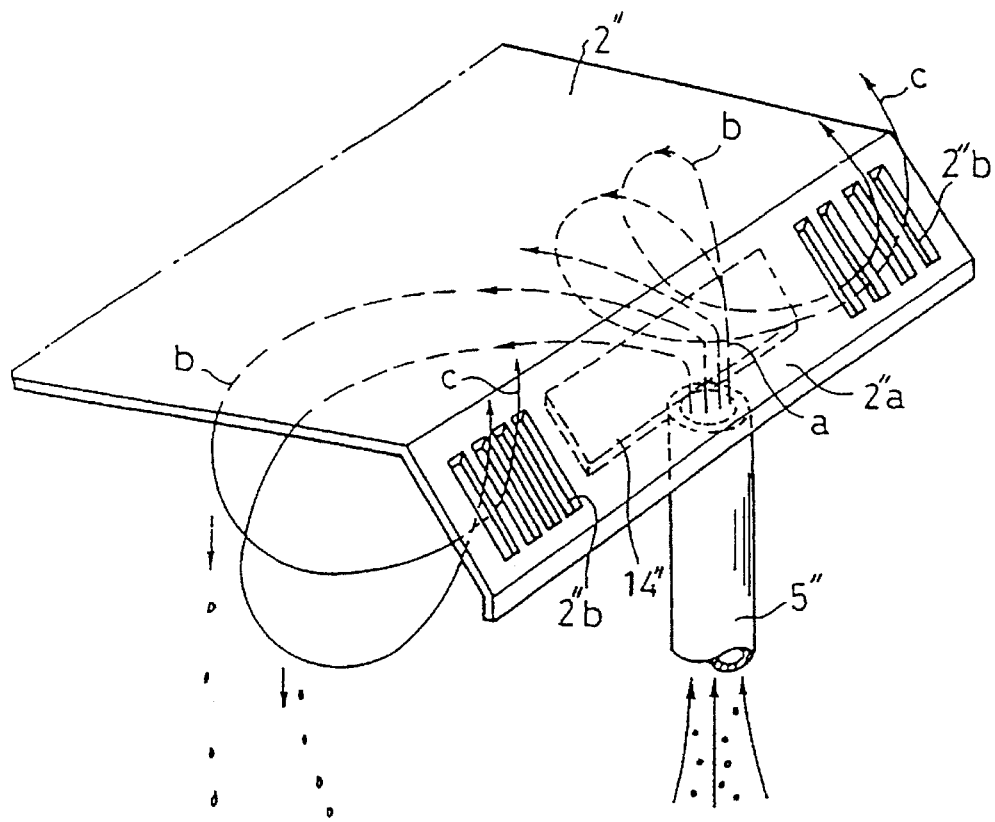
FIG. 17 is a perspective view of an important portion, showing a positional relation between the introduction sleeve and a partition wall, a structure of the partition wall, and the flow of water.
Figure 18:
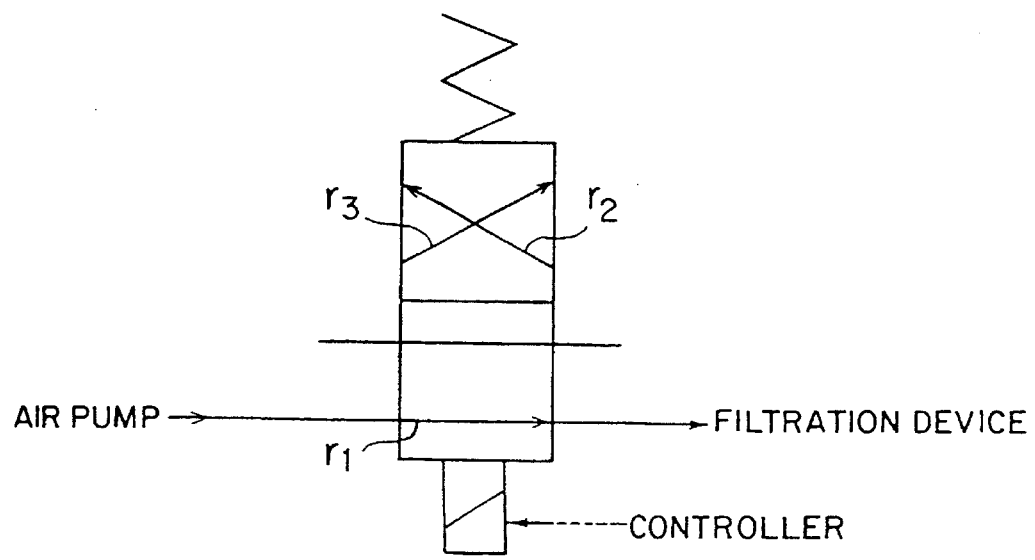
FIG. 18 is a schematic view showing one example of a selector switch.
Figure 19:
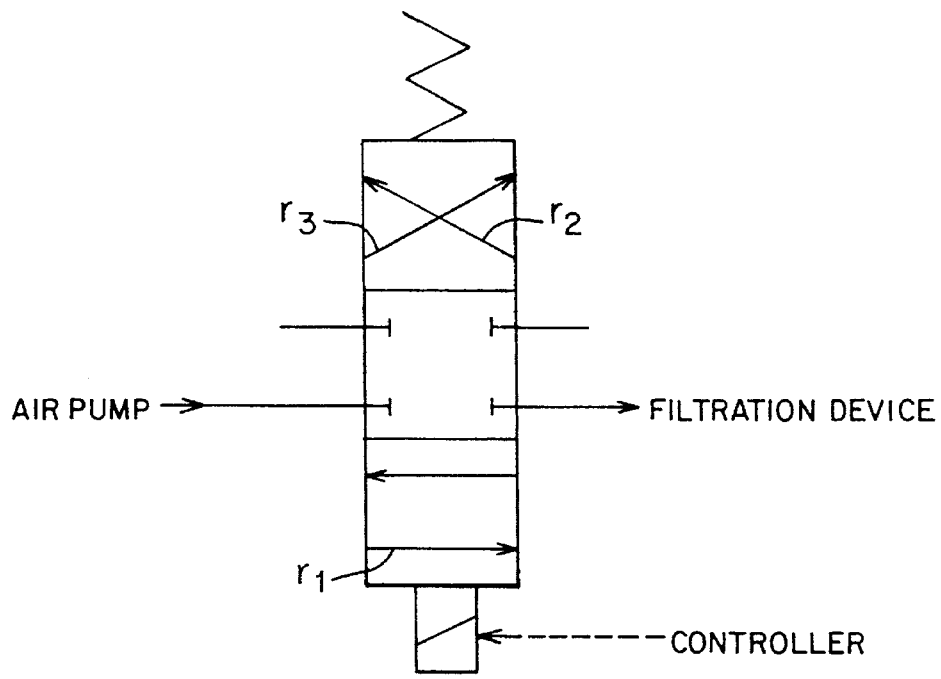
FIG. 19 is a schematic view showing another example of a selector switch.
Figure 20:
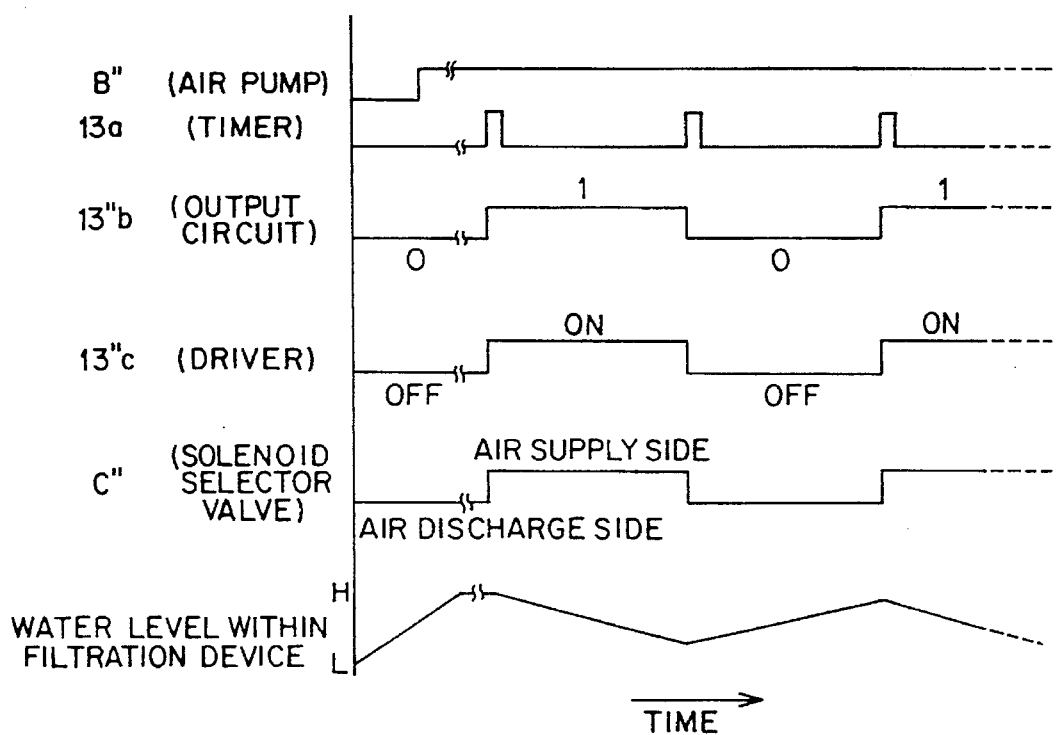
FIG. 20 is a timechart.

The present invention will now be described in detail with reference to the accompanying drawings, in which the present invention is embodied as a filtration system for a water tank. FIG. 1 is a vertical sectional view of a filtration system according to a first embodiment of the present invention, FIG. 2 is a plan view of the filtration system of FIG. 1, FIG. 3 is a sectional view of an important portion showing a holding state of a filter medium receiving portion and a fluid accelerator portion with respect to a housing, FIG. 4 is a plan view of an air jetting portion, FIG. 9 is a vertical sectional view of a filtration system according to a fifth embodiment of the invention, FIG. 10 is a perspective view of the filtration system of FIG. 9, FIG. 11 is a perspective view of an introduction sleeve, FIG. 12 is a perspective view of a diffusion separation member, FIG. 13 is a side view showing a using example of the filtration system of FIG. 9, FIG. 14 is a sectional view of another example of an important portion, FIG. 15 is a side view showing one example of a using mode, FIG. 16 is a vertical sectional view of a filtration system according to a sixth embodiment of the sixth invention, FIG. 17 is a perspective view of an important portion, showing a positional relation between the introduction sleeve and a partition wall, a structure of the partition wall, and the flow of water, FIG. 18 is a schematic view showing one example of a selector switch, FIG. 19 is a schematic view showing another example of a selector switch, and FIG. 20 is a timechart.

The filtration system according to this embodiment is used by being placed still in a water tank. This filtration system generally comprises a cylindrical housing A whose overall surface, excepting an upper surface and a lower surface, is tightly closed, a filter medium receiving portion B mounted on an upper portion within the housing, and a fluid accelerator portion C mounted on an upper end portion of the housing.

The housing A is provided at the center of a bottom plate 1 thereof with an introduction sleeve 2. This introduction sleeve 2 is employed such that the outside of the housing can communicate with the inside of the housing therethrough. A lower end portion of the introduction sleeve 2 is generally flush with a bottom surface of a bottom plate 1. An upper end portion of the introduction sleeve 2 is allowed to extend upwardly within the housing. The filter medium having the function of a weight (hereinafter referred to as "weight-functioning filter medium") 3, such as a group of pebbles or a group of ceramics balls easy to handle, is received on an upper surface of the bottom plate 1 up to an intermediate level of the full height (or length) of the introduction sleeve 2. On the upper side of the weight-functioning filter medium 3, a doughnut-like partition plate 5 is fitted to the introduction sleeve 2. This doughnut-like partition plate 5 has an inner diameter generally equal to the outer diameter of the introduction sleeve 2 and an outer diameter equal to the inner diameter of a peripheral wall 4 of the housing A. The partition plate 5 presses the top of the weight-functioning filter medium 3 and the internal edge of the partition plate 5 is firmly locked by a locking projection 6 formed on an outer periphery of an intermediate portion of the introduction sleeve 2. When the weight-functioning filter medium 3 is needed to be cleaned or replaced by a new one, the partition plate 5 may be removed upwardly. A plurality of through-holes 7 and 8 are formed respectively in the bottom plate 1 and that area of the introduction sleeve 2 which is lower than the partition plate 5. Owing to the foregoing arrangement, water in the water tank can pass through the through-holes 7 of the bottom plate 1 into the introduction sleeve 2 via the weight-functioning filter material 3. Legs 9 are formed on a lower end portion of the housing A or on a lower of the bottom plate 1. Those legs 9 are employed in order to define a flow path for drawing the water in the water tank into the introduction sleeve 2 between the bottom surface of the water tank and the bottom plate 1 when the filtration system is placed still on a bottom portion of the water tank.

By firmly securing the partition plate 5 to the introduction sleeve 2 at an intermediate portion of the full height of the sleeve 2, a precipitation portion 10 opening upwardly is defined by and among the introduction sleeve 2, the peripheral wall 4 and the partition plate 5.

The filter medium receiving portion B comprises a container body 11 having a hollow interior, and a closure (or lid) 12 for closing an upper opening of the container body 11. A suitable filter medium 13 such as lumps of chemical fibers, ceramics particulates or balls, or the like is received in the container body 11. The closure 12 may be removably attached to the container body 11 in order to facilitate cleaning of the filter medium when a filtered water flow path is jammed with captured particulates.

The container body 11 has a separation surface whose lower portion is formed into an inverted cone-like configuration. A plurality of through-holes 14 are formed in the separation surface. An area of the separation surface than the area where the plurality of through-holes 14 are formed, is defined as a collision surface as later described. The closure 12 is of a mesh-like structure. Therefore, in the filter medium receiving portion B, water flows into the container body 11 through the through-holes 14 from below. The water flowing into the container body 11 passes through the filter medium 13 and then flows out upwardly through the closure 12.

As shown in FIG. 3, the filter medium receiving portion B is removably mounted on an upper portion within the housing by being fitted to the housing A from above and locking a flange 15, which is formed on an upper end portion of the container body 11 and serves as a member to be locked, to a step portion 16 which is formed in an area in the vicinity of a peripheral edge of the opening of the housing A and serves as a locking portion, with the apex of the lower end portion of the separation surface held generally in alignment with the center of the introduction sleeve 2.

When the filter medium receiving portion B is firmly secured within the housing A, the container body 11 is in the state such that the apex faces the center of the introduction sleeve 2 and the slant separation surface is slightly upwardly spaced away from the upper end portion of the introduction sleeve 2.

The fluid accelerator portion C comprises a tubular cap 17 of different diameters, opening upwardly and downwardly, an air jetting portion 18 mounted within a lower portion of the cap 17, and a propeller fan 19 mounted within an upper portion of the cap 17. The cap 17 includes an upper reduced-diameter portion 17a and a lower enlarged-diameter portion 17b, thus exhibiting a convex configuration in section as a whole. The large-diameter portion 17b has a diameter equal to that of the housing A, so that the outer periphery of the enlarged-diameter portion 17b is flush with the peripheral wall 4 of the housing A. As shown in FIG. 3, the cap 17 is snap fitted to the housing A by fitting the lower end portion of the cap 17 to the upper end portion of the peripheral wall 4 and elastically fitting a projection 20 formed on the lower end portion of the cap 17 into a hole 21 formed in the upper end portion of the peripheral wall 4 of the housing A. Therefore, the fluid accelerator portion C can be removed from the housing A whenever necessary.

One end portion of a connection tube 23, which is bent into an L-shape, is press fitted into a through-hole 22 formed in a step portion 17c of the cap 17 from below, such that the one end portion of the connection tube 23 is allowed to project upwardly from the upper surface of the cap 17. Then, a stop ring 24 is applied to the connection tube 23 from above so that the connection tube 23 will not accidentally come off. The air jetting portion 18 is connected to the other end portion of the connection tube 23 which is situated inside the cap 17. As best shown in FIG. 4, the air jetting portion 18 is formed into a disk-like configuration having a hollow interior. A plurality of air jetting apertures 25 are formed in the upper surface of the air jetting portion 18 preferably along a single or double circumferences. The air jetting portion 18 is mounted such that the center of the air jetting portion 18 is in alignment with the center of the reduced-diameter portion 17a of the cap 17.

Ribs 26 and 27 radially formed are provided respectively to the inner sides of the upper and lower end portions of the reduced-diameter portion 17a of the cap 17. External ends of the ribs 26 and 27 are connected to the cap 17. Mutually opposing shaft bearing portions 28 and 29 are formed respectively on central portions of the upper and lower ribs 26 and 27. The propeller fan 19 is provided to the inner side of the reduced-diameter portion 17a. An upper and a lower portion of a shaft 30 of the propeller fan 19 are rotatably supported by the bearing portions 28 and 29, respectively.

In order to facilitate bearing of the shaft of the propeller fan 19 through the bearing portions 28 and 29, the reduced-diameter portion 17a of the cap 17 is vertically divided into two (upper and lower parts) at an intermediate portion thereof, and the two divided parts of the reduced-diameter portion 17a are connected at their divided surfaces (mating surfaces) by means of adhesive, fitting or threaded engagement.

With the construction mentioned above, the peripheral wall 4 of the housing A and the cap 17 may be integrally formed. In a preferred embodiment, the filter medium receiving portion B is of a cartridge type construction, in which the filter medium receiving portion B is removably attached to the housing A, and the fluid accelerator portion C is also of a cartridge type construction, in which the air jetting portion 18 and the propeller fan 19 are attached to the cap 17. The construction being such that if the fluid accelerator portion C is removed from the housing A, the filter medium receiving portion B can be easily removed. It should be appreciated, however, that the configuration of the housing A and the configuration of the cap 17 are not limited to the above embodiment. For example, the peripheral wall 4 of the housing A may integrally include the overall enlarged-diameter portion 17b of the cap 17, and the cap 17 may integrally include the overall reduced-diameter portion 17b and the step portion 17c formed on a lower end portion of the cap 17.

Operation of the construction according to the above embodiment will be described next.

For use of the filtration system of this invention, a distal end of an air discharge tube of an air pump, which is known per se, is connected to one end of the connection tube 23, then the filtration system is placed still on the bottom portion of the water tank, and then, the air pump is actuated. An air bubble jetted from the air jetting portion 18 is ascended through the filtered water flow path within the cap 17 under the effect of a lifting power. By this, water within the cap 17 is lifted upwardly. Air bubbles continuously jetted from the air jetting portion 18 and lifted upwardly rotate the propeller fan 19. Since the internal pressure of the cap 17 is reduced as the water in the cap 17 is forcibly discharged upwardly, a non-filtered water in the water tank is vigorously drawn into the introduction sleeve 2 from between the bottom surface of the housing A and the upper surface of the bottom of the water tank.

In this way, the water within the water tank is drawn from the bottom portion of the filtration system to the interior of the filtration system and discharged upwardly from the upper end face together with the air bubbles. As a result, a circulating water flow is produced within the water tank. The water drawn into the filtration system flows into the container body 11 through the through-holes 14 formed in the separation surface of the container body 11. Then, the water passes through the filter medium received in the container body 11 and flows into the flow path of the cap 17 via the closure 12. Then, the water is discharged again into the water tank from the flow path of the cap under the effect of the lifting power of the air bubbles jetted out of the air jetting portion 18 and the propelling force (or driving force) of the propeller fan 19.

In the case where the weight-functioning filter medium 3 is received on the bottom portion of the housing A and the through-holes 7 are formed in the bottom surface of the housing A and the lower portion of the introduction sleeve 2, a part of water to be drawn passes through the weight-functioning filter medium 3 and enters the introduction sleeve 2 via the through-holes 8. At that time, corruption factors contained in the non-filtered water are captured by the filter medium. Since the fluid path of the filter medium is jammed and blocked by the captured particulates which are increased with the passage of time, the filtration mode is shifted from the original filter medium filtration mode to a blocked (or closed) filtration mode. As a result, the filtration efficiency is increased.

The non-filtered water drawn into the introduction sleeve 2 ascends within the introduction sleeve 2. Since the upper end portion of the introduction sleeve 2 is open toward the filter medium receiving portion B in the area in the vicinity of the lower surface of the filter medium receiving portion B, those particulates having comparatively larger diameters, contained in the non-filtered water, hit the collision surface of the container body 11 of the filter medium receiving portion B where the through-holes 14 are not formed and fall back toward the precipitation portion 10. Since almost no water flow exists at the area of the precipitation portion 10, the corruption factors, which have hit and fall back, are precipitated in the precipitation portion and deposited there and condensed with the passage of time. In other words, in this filtration system, the corruption factors separated from the water in the water tank are taken into the filtration system and pooled.

The water ascending from the introduction sleeve 2 and those very small particulates which do not hit and therefore do not fall back from the separation surface of the container body 11 flow into the filter medium receiving portion B through the through-holes 14 of the container body 11. The very small particulates are captured by the filter medium 13. Since the separation surface of the filter medium receiving portion B is of an inverted cone-like configuration slant with respect to the water flow, a large filtration area can be obtained. Therefore, filtration efficiency is good. Since the filtered liquid in the filter medium receiving portion mostly flows to the region where a passage resistance is small, the amount of corruption factors captured is increased first from the peripheral portion of the filter medium receiving portion at an early stage of the use of this system. As the passage resistance is increased as a result of increase in a choked portion, the region where the particulates are captured gradually approaches the apex. Therefore, the high speed of passage of the forced water flow can be maintained for a long time.

Effects of the filtration system of this embodiment will be described. A forced water flow is produced by the air bubbles continuously jetted out of the air jetting portion 18 and ascending, and also by rotation of the propeller fan 19. Since triplicate or quadruplicate filtration operations are performed by means of filtration by the filter medium 3 on the bottom portion of the housing, hit and fall-back separation by the separation surface of the filter medium receiving portion B, precipitation and condensation in the precipitation portion 10, and filtration by the filter medium 13, remarkably high filtration efficiency can be obtained even in the compact filtration system. On the other hand, those corruption factors having a large diameter, drawn through the introduction sleeve 2, are separated by the separation surface of the filter medium receiving portion B and precipitated in the precipitation portion 10 and condensed. Therefore, the ability for capturing the very small particulates by the filter medium receiving portion B can be maintained for a long time. Therefore, the cleaning cycle period becomes long when compared with the conventional systems. Since the corruption factors captured from the water in the water tank are reserved or pooled in the system, hazardous components to the animals kept in the water tank are less produced and the animals suffer less from disease. Also, the plants in the water tank are prevented from abnormal growth.

Figure 5:
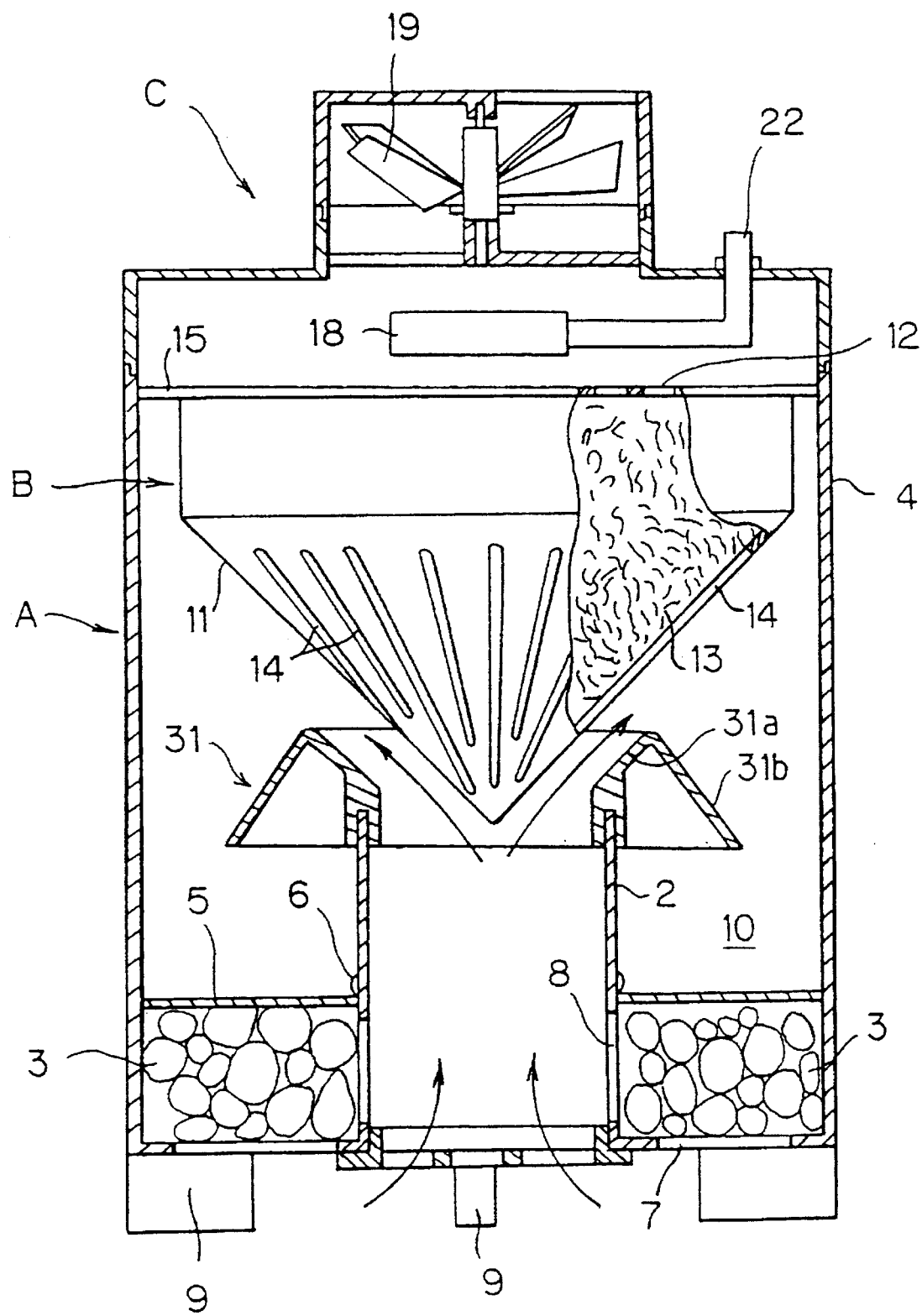
FIG. 5 is a vertical sectional view of a filtration system according to a second embodiment of the present invention.
Figure 6:
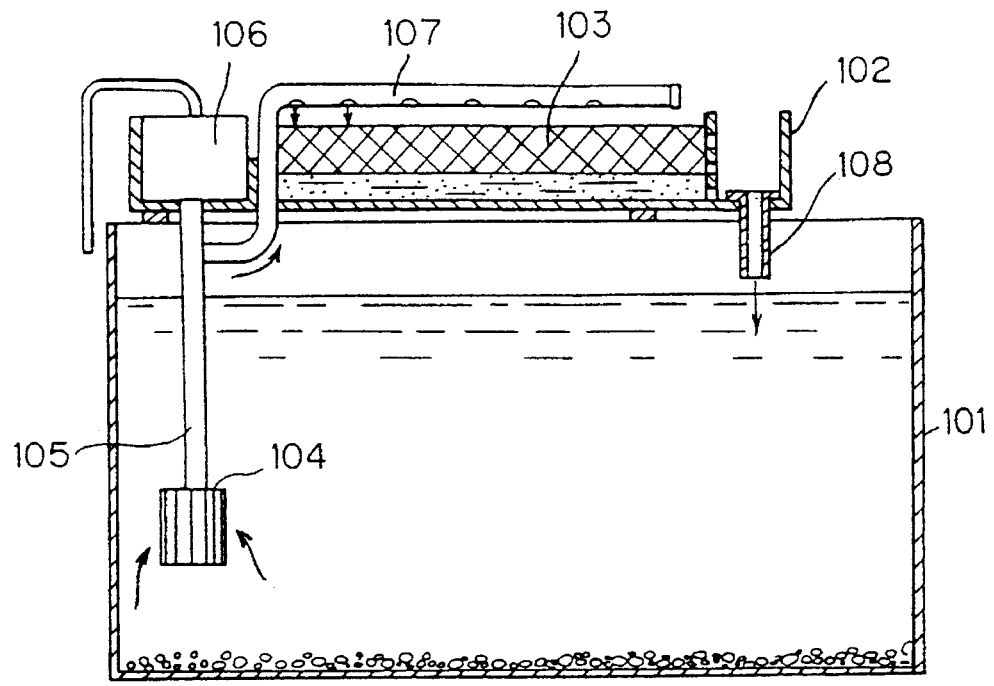
FIG. 6 is a vertical sectional view of one example of a conventional filtration system for a water tank.
Figure 7:
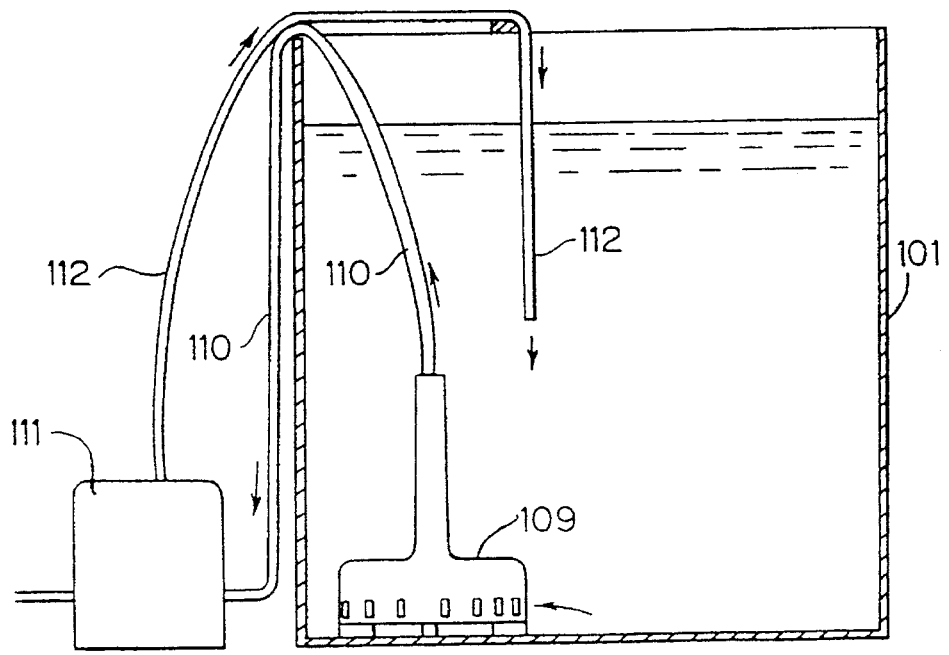
FIG. 7 is likewise a vertical sectional view of another example of a conventional filtration system for a water tank.
Figure 8:
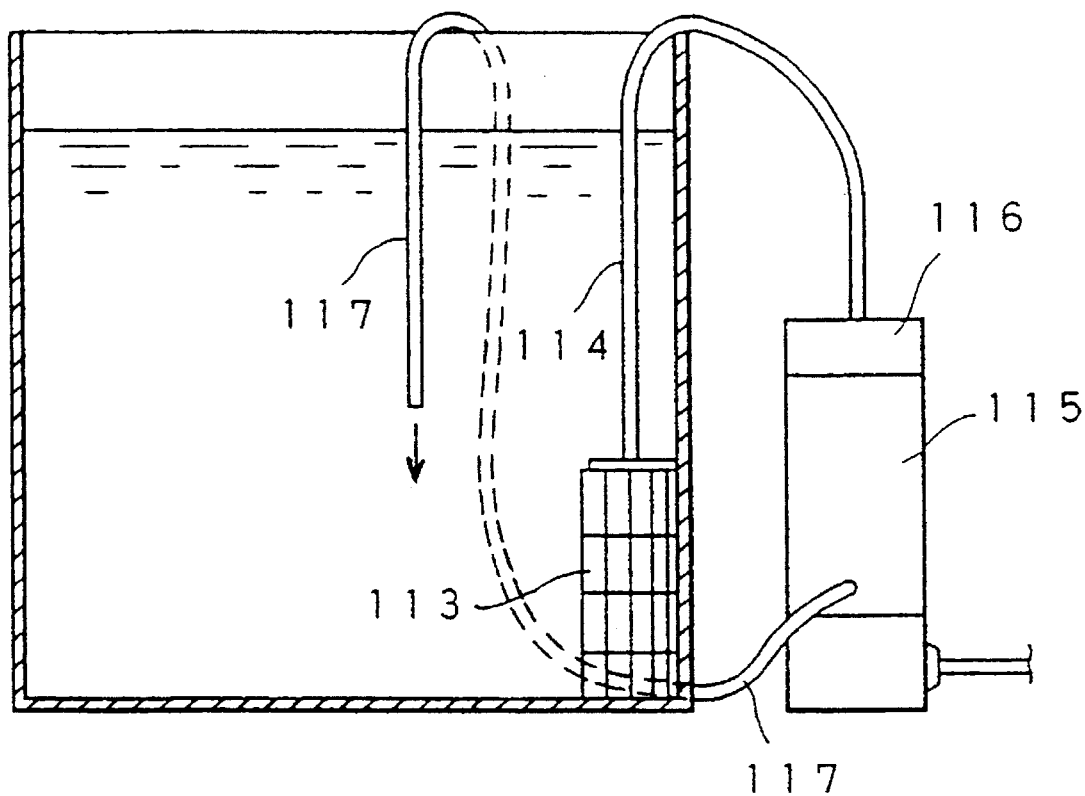
FIG. 8 is likewise a vertical sectional view of still another example of a conventional filtration system for a water tank.

FIG. 5 is a vertical sectional view showing a second embodiment of the present invention. Members either identical with or similar to those of the preceding embodiment are denoted by identical reference numerals, respectively, and only different constructions will be described.

In this embodiment, an introduction sleeve 2 is provided at an upper end portion thereof with a partition member 31 having an ascent funnel-like guide portion 31a extending generally in parallel with a separation surface of a filter medium receiving portion B up to an intermediate position of the separation surface, and a descent funnel-like guide portion 31b inclining toward a precipitation portion 10 from an upper end portion of the guide portion. Through-holes 14 formed in the separation surface of the filter medium receiving portion B are vertical slits continuous from a lower end portion of the separation surface to an upper end portion thereof, and arranged in a circumferential direction.

Since the partition member 31 includes the ascent funnel-like guide portion 31a extending generally in parallel with the separation surface of the filter medium receiving portion B, the water ascending within the introduction sleeve 2 is guided to flow to the area proximate to and along the separation surface. Therefore, hitting of the particulates contained in the filtered water against the separation surface is enhanced.

Since the partition member 31 includes the descent funnel-like guide portion 31b inclining toward a precipitation portion 10, a turbulent flow and an eddy flow are prevented from being produced within the precipitation portion 10. Therefore, the separated particulates are positively participated. Furthermore, the corruption factors once precipitated in the precipitation portion 10 are prevented from lifting or floating upwardly again and the captured matters are positively retained.

Further, since the through-holes 14 formed in the separation surface of a container body B are vertical slits, there is no fear that the corruption factors choke them in a short time. Even if the corruption factors should be retained or caught by some of the slits, they would easily escape from the slits by the continuously ascending water flow. Therefore, the time for lowering the speed of passage of the fluid within the system is delayed. A net can be attached to a lower portion of the introduction sleeve 2 in order to prevent entry of fishes kept in the water tank.

As mentioned above, the filtration system according to this embodiment is placed still in a fluid to allow the fluid to flow into the system so that corruption factors, corruption matters or particulates contained in the fluid are separated and captured. Therefore, this filtration system is, as mentioned above, suited to be used as a filtration system for a water tank for keeping aquatic animals and plants for hobby or ornamental purposes. It should be noted, however, that application of this embodiment is not limited but it can be likewise applied, for example, to a case where abrasive grains or cutting powders contained in an abrasive oil or cutting oil in a machine tool are separated therefrom. It may be also used to separate dust from air in a closed chamber or room. Suitable kinds of filter media may be selected in accordance with use.

As shown in FIG. 9, a filtration system according to another embodiment of the invention chiefly comprises a casing A', an introduction sleeve B' upstanding from a bottom portion of the casing A', and a diffusion separation member C' disposed on the upper side of the introduction sleeve B' within the casing A'. Preferably, the system further comprises a filter medium D at the inner side of an upper portion of the casing A', a space 13' is formed between the introduction sleeve B' and the diffusion separation member C', and a precipitation portion 10' communicating with the space 13' is defined by a peripheral wall and a bottom portion of the casing A' and the introduction sleeve B'.

Each of them will be described in more detail.

The casing A' is of a circular cylindrical or square cylindrical case-like configuration having a peripheral wall 1', a bottom plate 2' and a top plate 3'. The casing A' has an inlet port 4' formed in a bottom portion in order to allow the entry of an original fluid F into the casing A' therethrough, and an outlet port 5' formed in an upper portion thereof in order to allow the filtrated fluid to flow out therethrough.

In the illustrated preferred embodiment, although the inlet port 4' is formed in the bottom plate 2', it may be formed in a lower portion of the peripheral wall 1' of the casing A'. In case the inlet port 4' is formed in the bottom plate 2', legs 6' are formed on the bottom plate 2' in order to facilitate the entry of the original fluid F.

A lower end portion of the introduction sleeve B' is connected to the inlet port 4'. The introduction sleeve B' includes an upstanding portion 7' vertically extending up to a required height at the center within the casing A', and a trumpet-like dilating portion 8' formed on an upper end portion of the upstanding portion 7' and dilating upwardly. Reference numeral 9' denotes a trumpet-like skirt dilating downwardly. A lower end portion of the skirt 9' is spaced away from the peripheral wall 1' of the casing A'. In this way, a precipitation portion 10' is defined outside the upstanding portion 7' by a lower portion of the peripheral wall 1' of the casing A', the bottom plate 2' and the introduction sleeve B'.

The diffusion separation member C' is mounted above the introduction sleeve B' within the casing A'. The diffusion separation member C' includes an inverted cone-like filter surface 11'. The filter surface 11' comprises an umbrella-like plate with a plurality of through-holes 12' formed therein for passing a fluid therethrough. Shapes, sizes and distribution rate of the through-holes 12' are determined so as to match with the kinds, properties, sizes of foreign matters contained in the original fluid to which this filtration system is applied. In the illustrated preferred embodiment, the through-holes 12' are vertical slits continuous from a lower end portion of the filter surface toward the upper end portion and spacedly arranged in the circumferential direction.

The diffusion separation member C' is mounted such that the apex of the inverted cone-like filter surface is generally in alignment with the center of the upstanding portion 7' of the introduction sleeve B' and with a space 13' between the filter surface 11' and the dilated portion 8'. Therefore, the flow path within the upstanding portion of the introduction sleeve B' is communicated with the precipitation portion 10' via the space 13'.

In the illustrated example, in order to facilitate the mounting of the diffusion separation member C' on the casing A', a plurality of small through-holes 15' are formed in the central portion of the planar partition plate 14', the upper end portion of the diffusion separation member C' is connected to a lower surface of the partition plate 14' at an area outside the through-holes 15', and a peripheral edge portion of the partition plate 14' is secured to the peripheral wall 1'. However, the upper end portion of the diffusion separation member C' may be extended up to the peripheral wall 1' of the casing A', so that an end portion of the extension is connected directly to the peripheral wall 1'. In that case, there is no need of a provision of the partition plate 14'.

If necessary depending on an object to be filtered, a filter medium D is received in the upper side of the diffusion separation member C' within the casing A'. The filter medium D is suitably selected from one kind of layers or a combination of different kinds of layers of a group of pebbles, a group of ceramics balls, chemical fiber lumps, filter papers, etc., depending on properties, sizes, etc., of the foreign matters contained in the original fluid.

In the illustrated example, since the partition plate 14' is employed, the filter medium D is laid on the partition plate 14'. In case the diffusion separation member C' with a hollow interior is used as it is, the fluid, which has passed through the diffusion separation member C', flows toward the filter medium D in a spread state. Therefore, there is the advantage that resistance of passage of the fluid is lowered. However, a filter medium may be received also in the diffusion separation member C' depending on the kind of the original fluid. It suffices as long as the filter medium is provided at least on the upper side of the diffusion separation member C'.

Slightly below an upper plate 3' of the casing A', a partition plate 16' secured at a periphery thereof to the peripheral wall 1' and adapted to press an upper surface of the filter medium D is disposed, and a fluid collection chamber 17' is defined by and between the upper plate 3' and the partition plate 16'. The fluid collection chamber 17' is communicated with the outside through the outlet port 5'. The partition plate 16' also has a plurality of through-holes 18' formed therein.

In the illustrated embodiment, in addition to the above-mentioned basic constructions, a pump E for passing the fluid through the interior of the casing A' by means of pressure difference is mounted on an upper surface of the casing A'. A discharge tube 19' of the pump E may be open in the original fluid or open in the filtered fluid which is divided from the original fluid, depending on purposes for treating the fluid.

Also, in the illustrated embodiment, a discharge port 20' for withdrawing precipitates from the precipitation portion 10' is formed on a bottom portion of the precipitation portion 10'. One end of a discharge pipe 21' connected to a pump, not shown, is connected to this discharge port 20'. In the case where this filtration system is compact enough to be easily pulled up from the original fluid when precipitates are full, it may be designed such that a cock or the like is attached to the discharge port 20' so that the discharge port is normally closed, and the cock is opened to withdraw the precipitates after the system is pulled up from the fluid.

Subsequently, operation of the above-mentioned construction will be described.

When the fluid in the fluid collection portion 17' is drawn by the pump F, the original fluid E flows into the introduction sleeve B' through the inlet port 4' formed in the bottom portion of the casing A' under the effect of reduced pressure. After hitting the filter surface 11' of the diffusion separation member C' via the space 13', the original fluid E flows spreading by the space 13' between the filter surface 11' and the filter surface of the dilated portion 8'. During the course, those foreign matters having large mass hit the filter surface 11' and fall back toward a terminal end of the space 13'. Those foreign matters having so large sizes that they can not enter the through-holes 12' formed in the filter surface, are likewise moved toward the terminal end portion of the space 13' guided by the filter surface. The remaining very small foreign matters and fluid are moved upwardly through the through-holes 12' in the filter surface. In this way, the foreign matters contained in the original fluid flowing into the casing A' are mechanically separated by the filter surface, as a primary filtration function.

Separation of the foreign matters from the original fluid by the diffusion separation member C' is effectively made without a provision of the dilated portion 8' to the introduction sleeve B'. However, if there is a provision of the dilated portion 8', the diffusion and separation operation for the foreign matters is enhanced and the filtration effect is improved.

In order to prevent the fluid from flowing outside the terminal end of the space 13', the foreign matters moved outside of the terminal end portion of the space 13' are precipitated by gravity and deposited in the precipitation portion 10'. In other words, those foreign matters separated from the main flow or stream of the fluid by the primary filtration through said filter surface, are separated and captured by precipitation as a secondary filtration operation.

In case the flow rate of the fluid flowing into the introduction sleeve B' from the inlet port 4' is large, there is a possibility that some turbulent flow and eddy flow are produced outside the space 13'. In case the skirt 9' is employed, the precipitates in the precipitation portion 10' are prevented from lifting or floating upwardly. Therefore, those foreign matters which are captured, are precipitated in the precipitation portion 10' and condensed. Further, since a pocket 22' is defined on an upper portion of the outer periphery of the introduction sleeve B' by the skirt 9', if this filtration system is normally placed on the bottom portion of the water tank for keeping aquatic animals and plants for hobby or ornamental purposes, there are the advantages in that any hazardous gas produced from the precipitates deposited in the precipitation portion 10' are retained in the pocket 22' and prevented from flowing into the water tank.

The fluid, which has passed through the filter surface 11', is diffused within the upwardly dilating diffusion separation member and passed through the filter medium D thereabove. At that time, those very small foreign matters remaining in the fluid are caught by way of filtration through the filter medium or filtration through the choked filter. Since those foreign matters having large mass or large sizes are already discharged toward the precipitation portion side by the primary filtration, the time for completely choking the filter medium is greatly delayed and therefore, the filtration function is maintained for a long time. Also, the filter medium can be prevented from locally completely choked in an early time due to the diffusion effect provided by the diffusion separation member.

The fluid, which has passed through the filter medium D, is passed through the through-holes in the partition plate 16' and reaches the fluid collection portion 17'. The fluid is then drawn into the pump E through the outlet port 5' and discharged through the discharge tube 19'. The partition plate 16' has through-holes over the entire surface thereof, so that the fluid may flow into the fluid collection portion 17' from the entire upper surface of the filter medium D. Since resistance of passage of the fluid through the filter medium is small, effective filtration effects can be obtained.

When the precipitates in the precipitation portion 10' are increased, they may be discharged outside through the discharge port 20' by actuating another pump or by pulling up the system from the fluid and opening the cock. In the case where the pump E is provided with a direction selector means for switching a member to be connected on the inlet side and outlet side in the reverse way from the outlet port 5' and the discharge tube 19', the increased precipitates can be discharged through the discharge tube 21' by switching the pump E and in addition, the filter medium D and the diffusion separation member C' can be cleaned in a reverse way. Therefore, the filtration function can be maintained. If a check valve is provided in the upstanding portion 7' of the introduction sleeve B', more reliable discharging effects of the precipitates and reverse cleaning effects can be positively obtained.

As mentioned above, the fluid flowning into the casing A' can be effectively filtered through three steps of filtration operation; by means of separation by the diffusion separation member C', precipitation by the precipitation portion 10' and filtration by the filter medium D, before it flows out.

In the above-mentioned embodiment, in order to produce a pressure difference of the fluid within the casing A', a pump is mounted on an upper portion, as one example, so that the filter medium on the upper portion within the casing A' is drawn outside. However, the same effect can be obtained when the pump is provided on a lower portion of the casing, so that the original fluid is drawn therein. In the alternative, another external pump may be used, so that a pressure difference is produced within the filter system-to thereby flow the fluid. Also, when the original fluid is delivered under pressure as in the case with a discharge tube of factories, mines, or the like, the original fluid may flow directly into the inlet port 4' from the discharge tube and without a provision of the pump.

The filtration system according to this invention can be used not only for filtering very small particulates, dust, etc. contained in water, but also for improving and maintaining the environment or quality of water by capturing and removing bulky dusts, heavy foreign matters such as sediments and sludge precipitated and deposited as in rivers, lakes, dams, merely by making the system large in size.

Further, the system may be used for drawing and filtering dirt, dust, machining odds, cutting chips, etc. contained in a fluid such as air, water or oil from a distal end of an intake hose connected to an inlet port opening to the side of a peripheral wall of the bottom portion of the casing, together with the fluid.

FIG. 13 shows one example in which the present invention is used for drawing and capturing sediments, sledges, etc. deposited on the bottom of rivers, dams, etc., for the purposes of filtration. Reference character M denotes a motor, and E' denotes a pump actuated by the motor M. In this example, a bottom portion of the casing is formed like a hopper and foreign matters precipitated and deposited on the bottom portion of the casing are transferred into a container of a truck for transportation, by opening a plug of the discharge port by means of a cylinder S.

FIG. 14 is a sectional view of an important portion according to another embodiment of the invention. Remaining constructions are the same as the previous embodiment. In this embodiment, a plurality of diffusion separation mechanisms each comprising a trumpet-like dilating portion 8', 8' and an inverted cone-like filter surface 11', 11' arranged at a predetermined distance, are disposed in multistage above an inlet sleeve B'. Reference numeral 22' denotes connection members for connecting the dilated portions and the diffusion and separation members together.

In this way, by arranging the diffusion separation mechanisms in a multi-stage as shown in FIG. 14, even those foreign matters, which can not be sufficiently filtered by a single diffusion separation mechanism due to their properties, can be effectively separated and filtrated. Therefore, the originally intended effects can be realized by this embodiment.

FIG. 15 shows another example of use of the filtration system according to the first and second embodiments. That is, a plurality of filtration systems are placed adjacent to each other or connected to each other. One end of a discharge tube 19' of a filtration system FM1 on the upstream side of the fluid is connected to an inlet port of a filtration system FM2 on the downstream side. Owing to the foregoing arrangement, even if the original fluid F is so dirty that it can not be completely filtered by a single filtration system, can be effectively filtered. The same is true to those foreign matters which can not be completely filtered by a single filtration system due to their properties.

As mentioned above, according to the invention, filtration effects can be efficiently and positively obtained by a simple construction and through a combination of a plurality of separation mechanisms. Moreover, the filter path can be prevented from being fully choked in an early time, and filtration operation can be maintained for a long time.

This invention can be used for cleaning water in a water tank for aquatic animals and plants, water in a swimming pool, water in a bathtub and the like. It can be used for filtering air in a room or air in a factory and for filtering industrial oil such as abrasive oil, cutting oil, etc. Also, by making the system of this invention large in size, it can be used for cleaning water in rivers, lakes, dams, etc. and for removing sludge, etc. precipitated and deposited on the bottoms thereof.

As shown in FIG. 16, a filtration system according to another embodiment of the invention includes a filter device A", an air pump B", a selector valve C", and a controller D".

The filter device A" has a housing 1". The hollow interior of the housing 1" is vertically divided into a precipitation chamber 3" and a filter medium receiving chamber 4" by an intermediate partition wall 2". Within the precipitation chamber 3", an introduction sleeve 5" for guiding the original fluid from the bottom portion of the water tank toward the partition wall 2" is disposed. The partition wall 2" is provided at its area opposing an opening of the introduction sleeve 5" with a reflection surface 2"a for springing back the water coming from the introduction sleeve 5" toward the precipitation chamber 3". The partition wall 2" is further provided on opposite sides of the area of the reflection surface facing the opening of the introduction sleeve 5" with paths as through-holes 2"b for intercommunicating the precipitation chamber 3" and the filter medium receiving chamber 4". A filter medium 6" attached with aerobic bacteria is received in the filter medium receiving chamber 4". A ventilation port 7" for communicating an upper portion of the filter medium receiving chamber 4"

with the outside of the housing 1" is disposed at an upper portion of the housing 1".

The partition wall 2" provided between the precipitation chamber 3" and the filter medium receiving chamber 4" may be one (1) in number. However, in order to flow the water, which has passed through the through-holes 2"b formed in the partition wall 2", uniformly into and out of the filter medium receiving chamber 4", another partition wall 8" is disposed on the upper side of the partition wall 2" at a location slightly away from them. A flow path 9" is formed between opposing partition walls 2", and through-holes 8"a are formed in the partition wall 7" with an appropriate distance.

A discharge port of the air pump B" is connected to the selector valve C" through a connection tube 10", and the selector valve C" is in turn connected to a ventilation port 7" of the filter device A" through the connection tube 11". The selector valve C" switches the modes between a first mode in which the air discharged from the air pump B" is supplied to an upper portion of the filter medium receiving chamber 4" via the ventilation port 7" and a second mode in which the air in the filter medium receiving chamber is discharged toward the atmosphere side via the ventilation port 7", in response to a control signal from the controller D. Acceptable examples of such a selector valve include a four-port two-position selector valve as shown in FIG. 18, a four-port three-position selector valve as shown in FIG. 19, or a rotary selector valve known per se.

The controller D" is operated to give the selector valve C"a control signal for alternately switching a first mode in which the air discharged from the air pump B" is supplied to the filter device A" by the selector valve, to a second mode in which the air discharged from the air pump B" is discharged toward the atmosphere side and the air in the filter device A" is discharged toward the atmosphere side. Such a controller includes, as shown for example in FIG. 16, a control circuit 13" which comprises a power source circuit 12" for giving a power source to the air pump B" by turning on the power switch, a timer 13"a actuated by the power source given by the power source circuit 12" and which outputs a pulse whenever the counting value becomes a predetermined value, an output circuit 13"b using a flip-flop (bistable multi-vibrator) or the like which is changed over from the ON-state to the OFF-state and vice versa by the output pulse from the timer 13"a, and a driver circuit 13"c for performing a switching action by giving a control signal to the selector valve C" in accordance with the output from the output circuit.

However, the controller D" is not limited in its construction as long as it is capable of alternatively controllably switching a first mode in which the air discharged from the air pump B" is supplied to the filter device A" and a second mode in which the air discharged from the air pump B" is discharged toward the atmosphere side and the air in the filter device A" is discharged toward the atmosphere side in turn. The controller D" is not limited to one using a timer but may be those in which a flow meter is attached to the air pump B", the selector valve C" is automatically switched whenever the amount of discharge from the pump becomes a predetermined amount and the air pump B" is actuated and stopped alternately.

When this filter device is used with the above-mentioned construction, the filter device A" is sunk into the water W within a water tank T and fixed. At that time, since the selector valve C", as shown in FIG. 20, is switched to the non-actuating state (namely, the air within the filter device is switched onto the side where the air is discharged), the original water W within the water tank enters the filter device from a bottom portion of the filter device, i.e., from the bottom of the introduction sleeve 5". In accordance with the entry of this original water, the air within the separation is all discharged toward the atmosphere side from the ventilation port 11" via the connection tube 7" and the selector valve C".

The flow of water after the precipitation chamber 3" is filled with water is such that the water flowing out of the upper end portion of the introduction sleeve 5" first hits the reflection surface of the partition wall and falls back toward the precipitation chamber 3" and is diffused. Since the water, which has entered the precipitation chamber 3", becomes very slow in flowing speed, discharged materials, bait or feed, and other suspended corruption matters P contained in the original water are precipitated downwardly of the precipitation chamber 3". In other words, the original water, which has entered the filter device, is precipitated and filtered.

Reference numeral 14" denotes an auxiliary guide plate extending generally in parallel with the reflection surface 2"a of the partition wall 2". This auxiliary guide plate 14" is adapted to guide the water flowing out of the introduction sleeve to a position as far as possible from the introduction sleeve within the precipitation chamber. By this, precipitation effects of the corruption factors contained in the original water are enhanced.

Since the through-holes 2"b are provided on opposing sides of an upper position of the introduction sleeve 5", the water, which has entered the precipitation chamber, is, as shown in FIG. 17, flowed toward the through-holes 2"b on the opposing sides after making a back-flow at the upper part of the precipitation chamber. Then, the water flows into a flow path 9" between the upper partition wall 8" and the lower partition wall 2" through the through-holes 2"b and enters the filter medium receiving chamber 4" through the through-holes 8"a formed in the upper partition wall. Since a plurality of paths are spacedly arranged in the upper partition wall, entry of water is made smoothly.

Since a water-permeable filter medium 6" such as, for example, felt or others, the small corruption matters, which have passed the through-holes 2"a in the partition wall 2", are filtered by this filter medium 6". Since this filter medium 6" is attached with aerobic bacteria, in case the water lifted up to the filter medium receiving chamber 4" contains algae, seaweed, germs, etc. bled by phosphor, nitrogen produced from discharged materials from the animals in the water tank, the algae, etc. are killed by those bacteria (i.e., filtration by living things is taken place). When the captured amount of corruption matters is increased, filtration by chocked matter starts and filtration efficiency is enhanced, Next, when the power switch is turned on, the air pump B" actuates the controller D", and also activates the selection valve C" through the control circuit 13" so that the air discharged by the air pump B" is supplied to the filter medium receiving chamber 4" of the filter device A". As a result, the filtered water, which fully filled the filter medium receiving chamber 4" of the filter device A", the flow path 9" and the introduction sleeve 5" till that time, flows back and is discharged to the water tank T from the bottom portion of the filter device A". Since air blows into the filter medium receiving chamber 4" from above, the wetted filter medium 6" contacts the air. As a result, the aerobic bacteria attached to the filter medium 6" becomes active due to air exposure, and the anaerobic bacteria are killed.

However, since the time for switching the selector valve C″ by the controller D″ is set to a predetermined time, the supply of air is stopped when the air blown from the air pump B″ reaches the lower end portion of the filter medium receiving chamber 4″ or the flow path 9″. The supplying amount of air is limited to the extent that the corruption matters precipitated in the precipitation chamber 3″ are not lifted or floated upwardly by the back-flow of the water and do not flow back to the water tank T from the introduction sleeve 5″.

After the end of the supply of water for the predetermined time, the controller D″ switches the selector valve C″ again to other position. As a result, since the filter medium receiving chamber 4″ of the filter device A″ is communicated with the ambient air, water in the water tank T is lifted upwardly from the introduction sleeve 5″ as previously described, and the corruption matters P contained in the water are filtered in many ways such as filtration by precipitation, filtration by filter medium, filtration by living things. As a result, the aerobic bacteria in the filter medium 6″ become active again.

Therefore, during the time the air pump B″ is in operation, the drawing of water into the filter device and filtering of the water, back-flow of the filtered water into the water tank and exposure of the filter medium to air are performed in turn. By this, water in the water tank T is cleaned. Due to air exposure, the algae, seaweed, germs, etc. produced in water are lessened and anaerobic bacteria are not produced are not proliferated. Therefore, since the inner wall surface of the water tank T is not contaminated, transparency of the water tank is not lowered, and the animals and plants kept in the water tank can be watched always under good conditions.

As described in the foregoing, according to the present invention, since it is only necessary to switch one mode in which the air discharged from the air pump is blown into the filter medium receiving chamber of the filter device to another mode in which air is discharged to atmosphere from the filter medium receiving chamber in turn, there is no need of a provision, unlike the prior art, of an electric motor for driving the water pump.

Also, in the filter device, since filtration by precipitation, filtration by filter medium and filtration by living things are made in a composite fashion, filter efficiency is improved.

Further, since air is blown into the filter medium receiving chamber, the aerobic bacteria attached to the filter medium becomes active and anaerobic bacteria are not proliferated. Therefore, filtration by living things is enhanced and, filtration efficiency is remarkably increased as a whole.

Since the supply of air to the filter device and the discharge of air from the filter device are alternately performed by switching of the selector valve or switching of the actuating mode and stopping mode of the air pump alternately, there can be easily obtained such a construction and a control in which an electric motor is no more required, filtration efficiency is improved, and filtration by living things is enhanced. In addition, operation costs are low. As described in the foregoing, in the filtration system according to the first invention, since the propeller fan is rotated by air jetted out of the air jetting portion provided on the upper portion of the filter medium within the housing, filtration efficiency is remarkably improved even when the system is made compact, and in addition, no noises are produced and the number of attachments can be minimized.

According to the second invention, there is a provision of a precipitation portion defined by and among the bottom wall and peripheral wall of the housing and the introduction sleeve, the filter medium receiving portion including an inverted cone-like separation surface having an apex generally on the center of the introduction sleeve, the separation surface including a collision surface for allowing the corruption factors contained in the original fluid to hit, and a plurality of through-holes. Since the amount of corruption factors captured directly by the filter medium is small, the speed of passage of the fluid through the filter medium is not lowered in an early time and the time required for complete choking is delayed. Therefore, filtration efficiency is more improved.

According to the third invention, since the filter medium receiving portion is of a cartridge type construction and includes a portion to be locked to an upper portion of the housing, the filtration system can be easily mounted on and removed from the housing. Attachments to the separation surface can be easily removed and cleaned. In addition, the filter medium receiving portion can be replaced independently.

According to the fourth invention, since the fluid accelerator portion is of a cartridge type construction and removably attached to an upper portion of the housing, it can be easily removed in accordance with necessity and the filter medium receiving portion can be easily removed for cleaning. In addition, the filter medium receiving portion can be replaced independently.

While some preferred embodiments of a filtration system according to the present invention have thus far been described with reference to the drawings, it should be borne in mind that such embodiments are merely illustrative of the gist of the present invention and are accordingly subject to modification and change.

What is claimed is:

1. A filtration system comprising:

a housing having an overall surface including a bottom surface, an upper surface and a peripheral wall, with the overall surface being tightly closed, except at the bottom surface and the upper surface, with said bottom surface having an inlet to said housing and said upper surface having an outlet to said housing;

a filter medium disposed within said housing and through which said fluid entering said housing through said inlet passes;

an air jetting portion disposed within said housing at a higher location than said filter medium; and a propeller fan disposed at an upper portion of said housing and rotated by air which is jetted from said air jetting portion, with said fluid passing through said filter medium exiting said housing through said outlet by means of said propeller fan.

2. A filtration system comprising:

a housing;

an introduction sleeve for introducing an original fluid upwardly within said housing from a bottom portion of said housing;

a precipitation portion formed between a bottom wall and a peripheral wall of said housing and said introduction sleeve;

a filter medium receiving portion disposed at a higher location than said introduction sleeve within said housing;

an air jetting portion disposed at a higher location than said filter medium receiving portion within said housing; and a propeller fan disposed at an outlet port formed at an upper portion of said housing and rotated by air jetted from said air jetting portion;

said filter medium receiving portion including a separation surface having a shape of an inverted cone with an apex thereof arranged substantially along a center line of said introduction sleeve, said separation surface including a collision surface to be hit by contaminants contained in said original fluid so that the contaminants fall back toward said precipitation portion and a plurality of through-holes for passing the fluid therethrough.

3. A filtration system as claimed in claim 2, in which said introduction sleeve is provided at an upper end portion thereof with a partition member having an ascent funnel shaped guide portion extending generally in parallel with the separation surface of said filter medium receiving portion up to an intermediate position of the separation surface, and a descent funnel-like guide portion inclining toward said precipitation portion from an upper end portion of said guide portion.

4. A filtration system as claimed in claim 2 or 3, further comprising a filter medium receiving portion for receiving therein a filter medium, said filter medium receiving portion being formed on a lower side of said housing, a through-hole for passing therethrough the original fluid to said filter medium receiving portion is formed in a bottom portion of said filter medium receiving portion, and a through-hole for passing therethrough a fluid from said filter medium receiving portion to said introduction sleeve is formed in said introduction sleeve, and said filter medium receiving portion and said filter medium therein functioning to prevent movement of said housing due to the weight thereof.

5. A filtration system as claimed in one of claims 2 or 3, in which said through-holes formed in said separation surface are vertical slits continuous from a lower end portion of said separation surface to an upper end portion thereof, and arranged in a circumferential direction.

6. A filtration system as claimed in one of claims 2 or 3, in which:

said filter medium receiving portion includes a filter medium receiving cartridge comprising a container body provided on a lower surface thereof with said separation surface and containing therein a filter medium, and a closure for closing an upper opening of said container body;

said housing has a locking portion for locking the filter medium receiving cartridge in position in said housing when said filter medium receiving portion is fit adjacent an inner side of an upper portion of the peripheral wall of said housing; and further comprising:

a fluid accelerating cartridge containing said air jetting portion and said propeller fan, said fluid accelerating cartridge including a tubular cap having a first upper portion of a first diameter and a second lower portion of a second diameter larger than said first diameter, with said lower portion being open at upper and lower ends thereof and being connected to a lower end of said upper portion and said air jetting portion is mounted on an inner side of the lower portion of said tubular cap, a connection tube having opposite ends, one end of which is connected to said air jetting portion and the other end projects outwardly of said cap, and in which:

said propeller fan is built in an inner side of the upper portion of said cap above said air jetting portion, and a lower end portion of said cap is removably connected to an upper end portion of said housing.

7. A filter medium receiving cartridge for removable securement to an inner side of an upper portion of a housing of a filtration system for filtering fluid containing contaminants, said cartridge comprising:

a container body provided on a lower surface thereof with a separation surface having a shape of an inverted cone, said separation surface being formed by a collision surface and a plurality of through-holes wherein contaminants hit the collision surface and fall back while fluid passes through the through-holes, said container body containing therein a filter medium, and a mesh closure for closing an upper surface of said container body.

8. A fluid accelerating cartridge for securement to a housing of a filtration system, comprising:

a tubular cap having a first upper portion of a first diameter and a second lower portion of a second diameter larger than said first diameter, with said lower portion being open at upper and lower ends thereof and being connected to a lower end of said upper portion;

an air jetting portion mounted on an inner side of the lower portion of said tubular cap, a connection tube having opposite ends, one end of which is connected to said air jetting portion and the other end of which projects outwardly of said cap, and a propeller fan built in the upper portion of said cap above said air jetting portion, a lower end portion of said cap being removably attachable to an upper portion of the housing of the filtration system.

9. A filtration system comprising:

a casing having an inlet port formed in a bottom portion thereof and an outlet port formed in an upper portion thereof;

an introduction sleeve connected to said inlet port and upstanding within said casing;

a diffusion separation member mounted within said casing, with a space between an upper end portion of said introduction sleeve portion and said diffusion separation member, said diffusion separation member having a filter surface with a shape of an inverted cone; and a precipitation portion formed by a peripheral wall and a bottom portion of said casing and said introduction sleeve, said precipitation portion communicating with said space.

10. A filtration system comprising:

a casing having an inlet port formed in a bottom portion thereof and an outlet port formed in an upper portion thereof;

an introduction sleeve connected to said inlet port and upstanding within said casing, said introduction sleeve being provided on an upper end portion thereof with a trumpet shaped dilated portion dilating upwardly;

a diffusion separation member mounted within said casing, with a space between an upper end portion of said introduction sleeve portion and said diffusion separation member, said diffusion separation member having a filter surface with a shape of an inverted cone, and the inverted filter surface of said diffusion separation member being inserted in said dilated portion of said introduction sleeve, with a space between said dilated portion and said inverted filter surface; and a precipitation portion formed by a peripheral wall and a bottom portion of said casing and said introduction sleeve, said precipitation portion communicating with said space.

11. A filtration system as claimed in claim 9 or 10, further comprising a filter medium disposed at least on the upper side of said diffusion separation member within said casing.

12. A filtration system as claimed in claim 9 or 10, further comprising a pump for forcibly flowing a fluid from said inlet port toward said outlet port.

13. A filtration system as claimed in claim 9 or 10, further comprising a discharge port for discharging precipitates on the precipitation portion outwardly of said casing.

14. A filtration system comprising:

a filter device including:

a housing having a horizontal intermediate partition wall which vertically divides said housing into a precipitation chamber and a filter medium receiving chamber, said housing having a ventilation port, an introduction sleeve disposed within said precipitation chamber for guiding an original liquid from a bottom portion of a water tank toward said partition wall, and a reflection surface formed on said partition wall at a location facing an opening of said introduction sleeve, for reflecting back the original liquid coming from said introduction sleeve toward said precipitation chamber, said precipitation chamber communicating with said filter medium receiving chamber through paths formed on opposite sides of said reflection surface at a location opposing the opening of said introduction sleeve, a filter medium attached with aerobic bacteria being received in said filter medium receiving chamber, an upper portion of said filter medium receiving chamber communicating with an outside of said housing through the ventilation port formed in said housing;

an air pump;

means for switching a mode between a first mode in which air discharged from said air pump is supplied to an upper portion of said filter medium receiving chamber via said ventilation port and a second mode in which the air discharged from said air pump is discharged outside from the upper portion of said filter medium receiving chamber through said ventilation port.

15. A filtration system as claimed in claim 14, wherein said means for switching includes:

a selector valve for switching the mode between said first mode and said second mode, and a controller for controlling said selector valve to switch the mode between the first mode and the second mode at a predetermined time interval.

16. A filtration system as claimed in claim 15, in which said controller is capable of maintaining said first mode until the air supplied to said filter medium receiving chamber reaches a bottom portion of said filter medium receiving chamber, and said second mode until a water surface in said filter medium receiving chamber reaches an upper portion of said filter medium receiving chamber as the air is discharged from said filter medium receiving chamber.

17. A filtration system as claimed in claim 16, in which said controller comprises a variable timer, an output circuit capable of switching the ON/OFF states in accordance with an output from said timer, and a driver circuit for switching the mode of said selector valve in accordance with an output from said output circuit.

\* \* \* \* \*